(12) United States Patent
Yoshida

(10) Patent No.: US 10,969,612 B2
(45) Date of Patent: Apr. 6, 2021

(54) DISPLAY DEVICE AND MANUFACTURING METHOD THEREOF

(71) Applicant: Tianma Japan, Ltd., Kanagawa (JP)

(72) Inventor: Hitoshi Yoshida, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 5 days.

(21) Appl. No.: 16/248,076

(22) Filed: Jan. 15, 2019

(65) Prior Publication Data

US 2019/0219862 A1 Jul. 18, 2019

(30) Foreign Application Priority Data

Jan. 15, 2018 (JP) ................ JP2018-004561
Sep. 10, 2018 (JP) ................ JP2018-168634

(51) Int. Cl.
*G02F 1/1333* (2006.01)
*G02F 1/1335* (2006.01)

(52) U.S. Cl.
CPC .. *G02F 1/133308* (2013.01); *G02F 1/133514* (2013.01); *G02F 1/133528* (2013.01); *G02F 1/13332* (2021.01); *G02F 1/133314* (2021.01); *G02F 1/133317* (2021.01); *G02F 1/133328* (2021.01); *G02F 2202/28* (2013.01)

(58) Field of Classification Search
CPC ......... G02F 1/133308; G02F 1/133528; G02F 1/133514; G02F 2202/28; G02F 2001/133314; G02F 2001/133317
See application file for complete search history.

(56) References Cited

U.S. PATENT DOCUMENTS

| 8,848,123 B2* | 9/2014 | Min ................. G02F 1/133308 349/40 |
| 2013/0127743 A1* | 5/2013 | Chen ................... G06F 3/041 345/173 |
| 2013/0300975 A1* | 11/2013 | Suzuki ................ H05K 5/0017 349/58 |
| 2013/0308075 A1* | 11/2013 | Watanabe ......... G02F 1/133308 349/61 |
| 2013/0329395 A1* | 12/2013 | Tsai ..................... G06F 3/0412 362/19 |
| 2014/0232969 A1 | 8/2014 | Tsubaki et al. |

(Continued)

FOREIGN PATENT DOCUMENTS

JP 2014-160218 A 9/2014
JP 2016-194670 A 11/2016

*Primary Examiner* — Hoan C Nguyen
(74) *Attorney, Agent, or Firm* — Nixon & Vanderhye

(57) ABSTRACT

A display device includes a display panel disposed in front of a chassis, a front surface plate disposed in front of the display panel and holding the display panel in a suspended state via an optical elasticity resin layer, and a bracket fixed to a side face of the chassis and bonded to a rear surface of the front surface plate by an adhesive portion. The bracket includes a side wall portion that is fixed to the side face of the chassis, rises from rear to front, and extends along a side of the front surface plate, and a beam portion in front of the side wall portion. The beam portion extends along the side of the front surface plate, and protrudes along the rear surface of the front surface plate, from the side wall portion to a space between the display panel and the front surface plate.

5 Claims, 19 Drawing Sheets

(56) References Cited

U.S. PATENT DOCUMENTS

| | | | |
|---|---|---|---|
| 2015/0116609 A1* | 4/2015 | Arita | G02F 1/13338 349/12 |
| 2016/0291391 A1 | 10/2016 | Yoshida | |
| 2018/0113352 A1* | 4/2018 | Arita | G02B 6/0055 |

* cited by examiner

DISPLAY DEVICE AND MANUFACTURING METHOD THEREOF

CROSS-REFERENCE TO RELATED APPLICATIONS

The present application claims priority from Japanese patent application JP2018-004561 filed on Jan. 15, 2018 and Japanese patent application JP2018-168634 filed on Sep. 10, 2018, the contents of which are hereby incorporated by reference into this application.

BACKGROUND

The present disclosure relates to a display device and a manufacturing method thereof.

Regarding display devices, one known structure is one in which a front surface panel such as a decorative cover glass or a touch panel is bonded by an optical elasticity resin layer such as an optical clear resin (OCR) or an optical clear adhesive (OCA).

It is possible to improve image quality by bonding a front surface plate to the display panel by a thin optical elasticity resin layer. JP 2016-194670 A, for example, discloses a structure in which a liquid crystal panel is bonded to a front surface plate and is suspended away from a chassis (backlight unit).

In the structure disclosed in JP 2016-194670 A, the chassis is positioned on the side face of an intermediate member and a gap is provided between the chassis and the display panel by a retaining structure in which the display panel is suspended from the front surface plate by the intermediate member and an optical elasticity resin, and a gap is provided between the display panel and the chassis. The chassis is constituted of an inner chassis and an outer chassis. The outer chassis and the front surface plate are bonded to each other. By widening the outer chassis and increasing the bonding area, it is possible to increase the bonding strength.

JP 2014-160218 A discloses a structure in which a cover glass support case of a backlight unit is used to fix in place the cover glass with a double-sided tape and an adhesive. The cover glass and LCD panel are bonded to each other by a UV curable resin, and a display cover support case and a cover glass are fixed to each other by a double-sided tape and an adhesive. By reinforcing the adhesion by the double-sided tape with the adhesive, the cover glass is prevented from being peeled away.

SUMMARY

The goal in designing display devices has always been to reduce the area of the region surrounding the outer periphery of the display region (hereinafter referred to as the frame region) in relation to the outer dimensions of the display device.

In the structure disclosed in JP 2016-194670 A, the bonding area needs to be increased in order to ensure sufficient bonding strength between the outer chassis and the front surface plate, but the outer chassis cannot be made larger than the external shape of the front surface plate. Also, when bonding the internal chassis to the front surface plate, the intermediate member is larger than the display panel, and thus, it is not possible to ensure a sufficient bonding area.

In the structure disclosed in JP 2014-160218 A, at the side of a liquid crystal panel having flexible printed circuits (FPCs), the FPCs are drawn to the rear of the display cover support case, and thus, it is not possible to fix the display cover support case to the cover glass by double-sided tape or an adhesive in that area. In order to fix the display cover support case to the cover glass, there is a need to make the cover glass (frame region) large and secure a bonding surface to the outside of the FPCs.

An aspect of the present disclosure is a display device including: a chassis; a display panel disposed in front of the chassis; a front surface plate that is disposed in front of the display panel, and that holds the display panel in a suspended state via an optical elasticity resin layer; and a bracket that is fixed to a side face of the chassis and bonded to a rear surface of the front surface plate by an adhesive portion. The bracket includes: a side wall portion that is fixed to the side face of the chassis, rises from rear to front, and extends along a side of the front surface plate; and a beam portion in front of the side wall portion. The beam portion extends along the side of the front surface plate, and protrudes along the rear surface of the front surface plate, from the side wall portion to a space between the display panel and the front surface plate. The adhesive portion is bonded to a front surface of the beam portion and to the rear surface of the front surface plate. At the front surface of the beam portion and the rear surface of the front surface plate, an adhesive region of the adhesive portion includes a region between the display panel and the front surface plate.

It is to be understood that both the foregoing general description and the following detailed description are exemplary and explanatory and are not restrictive of this disclosure.

DETAILED DESCRIPTION OF EMBODIMENTS

Hereinafter, embodiments of the present disclosure will be described with reference to the accompanying drawings. It should be noted that the embodiments are merely examples to implement the present disclosure and are not to limit the technical scope of the present disclosure.

Embodiment 1

Figure 1A:
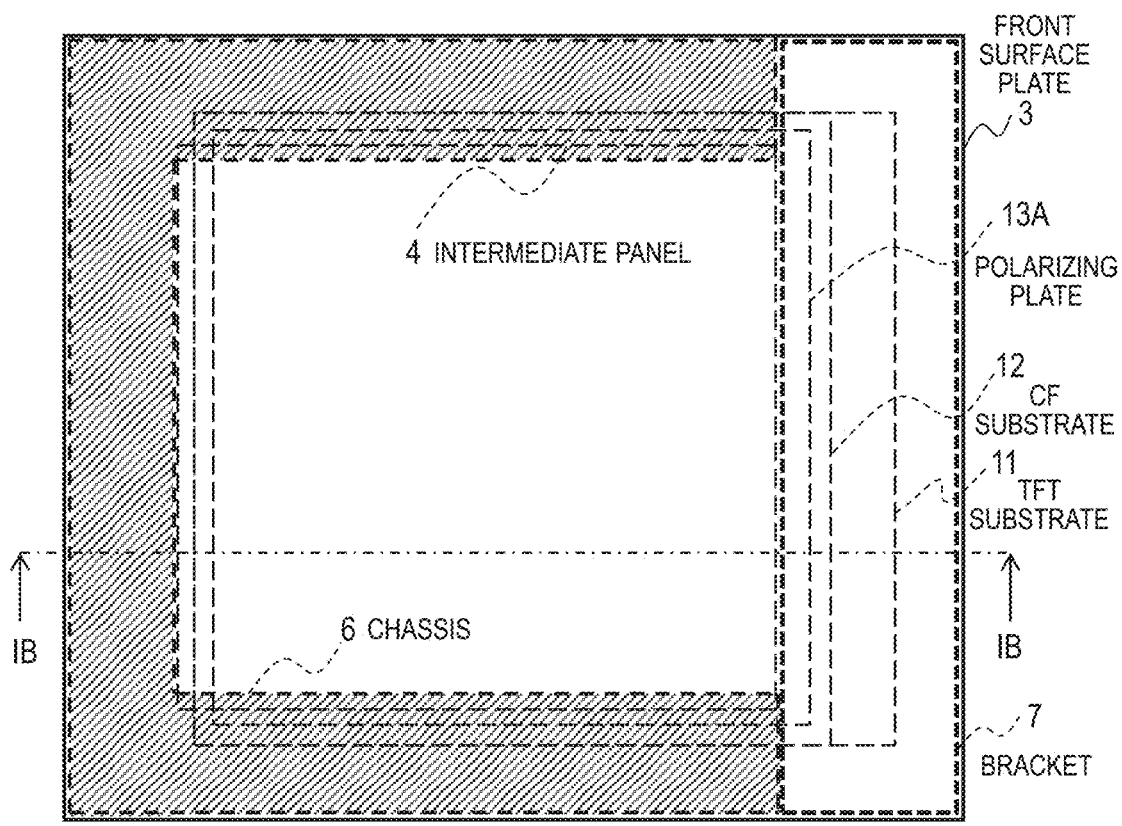
FIG. 1A depicts the entire display device according to Embodiment 1.
Figure 1B:
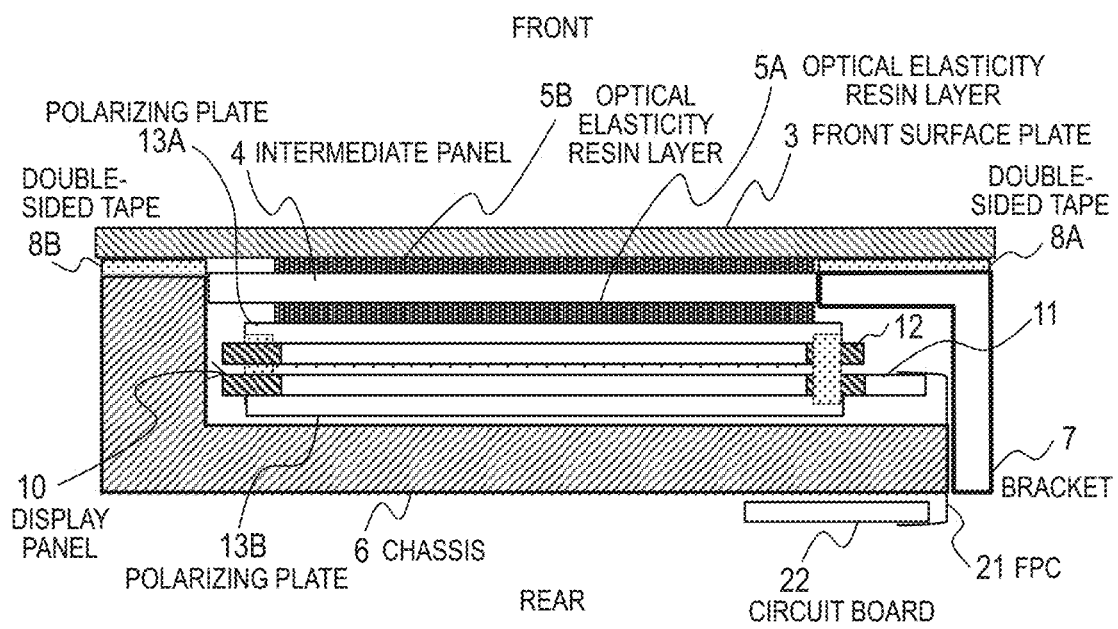
FIG. 1B depicts a cross-sectional structure along the line IB-IB of FIG. 1A.

FIGS. 1A to 1D schematically depict a configuration example of a display device according to Embodiment 1. Below, the side towards the user who views images displayed in the display device is referred to as the front side, and the side opposite thereto is referred to as the rear side. FIG. 1A depicts the display device as seen from the front. FIG. 1A depicts the entire display device. FIG. 1B depicts a cross-sectional structure along the line IB-IB of FIG. 1A.

Figure 1C:
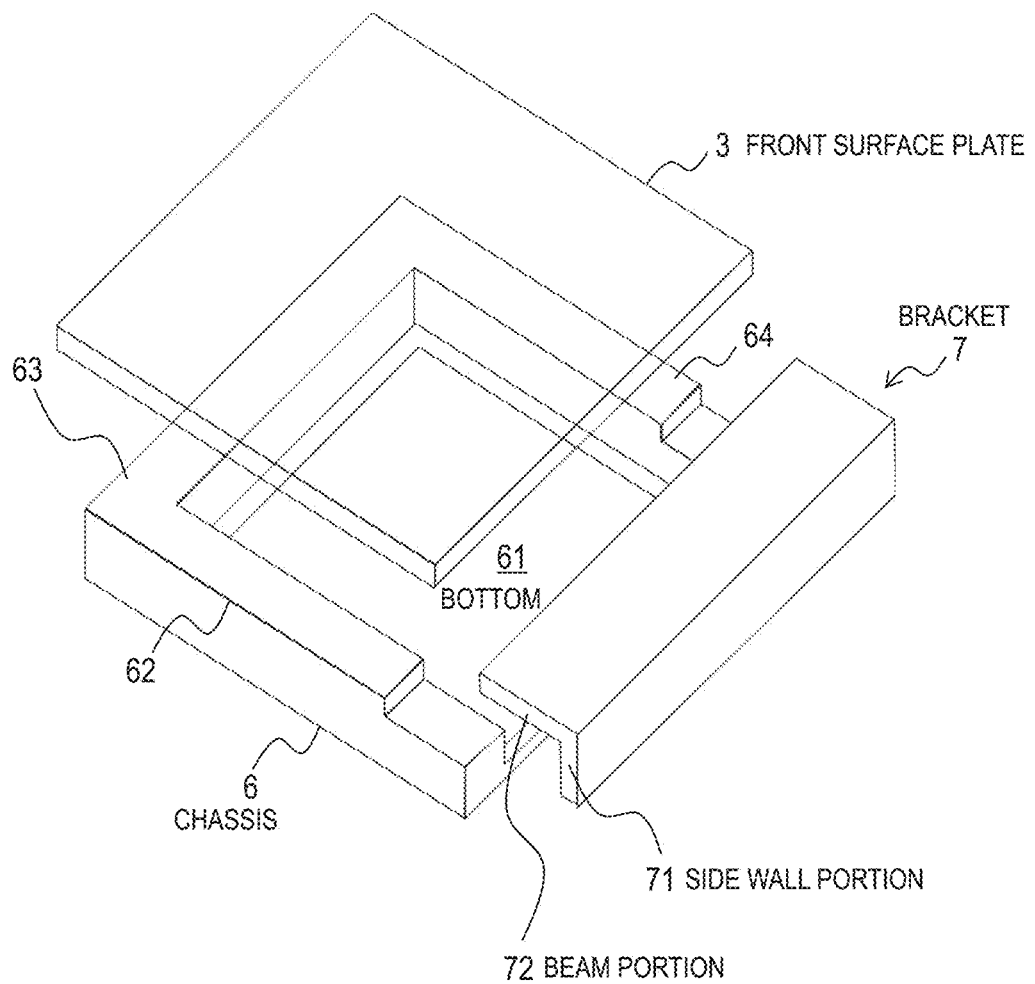
FIG. 1C is a perspective view of components in a portion according to the display device of Embodiment 1.
Figure 1D:
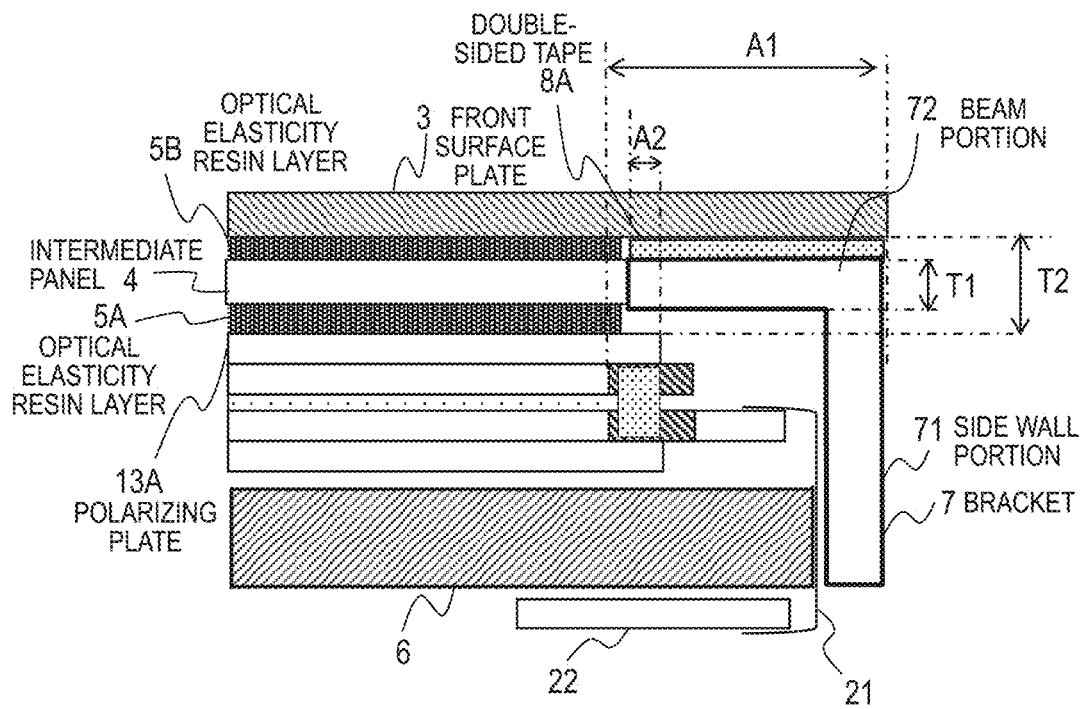
FIG. 1D depicts a portion of the cross-sectional view depicted in FIG. 1B.

FIG. 1C is a perspective view of components in a portion of the display device. FIG. 1D depicts a portion of the cross-sectional view depicted in FIG. 1B.

In FIG. 1A, a front surface plate 3, which is at the most front side of the display device, is depicted with a solid line, while components disposed behind the front surface plate 3 are depicted with broken lines. FIG. 1A depicts an example of only some of the components disposed to the rear of the front surface plate 3. The front surface plate 3 is made of glass or resin, for example. In this example, the front surface plate 3 is rectangular and has four sides (side faces) that define the external shape thereof. The front surface plate 3 may have a polygonal shape other than a rectangle.

As depicted in FIG. 1B, an intermediate panel 4, a display panel 10, a chassis 6, and a bracket 7 are disposed to the rear of the front surface plate 3. The intermediate panel 4 is a touch panel including one or more transparent insulating substrates, for example. The display panel 10 in this example is a liquid crystal panel.

As depicted in FIG. 1A, the outer shape of the front surface plate 3 is larger than the intermediate panel 4 and the display panel 10, and completely cover the intermediate panel 4 and the display panel 10 from the front (in a plan view). In other words, the intermediate panel 4 and the display panel 10 are encompassed by the external shape of the front surface plate 3 as seen from the front. In the example of FIG. 1A, the outer shape of the front surface plate 3 substantially coincides with the outer shape of a case constituted of the chassis 6 and the bracket 7 (side plate).

FIG. 1C schematically depicts the configuration of the case constituted of the chassis 6 and the bracket 7. The chassis 6 is made of a resin such as an epoxy resin or an acrylic resin, for example. The bracket 7 is made of a metal such as iron or stainless steel, for example. There is no special limitation on the materials forming the chassis 6 and the bracket 7.

The chassis 6 is box-shaped, and includes a bottom 61 and three side walls 62, 63, and 64, which rise to the front from the bottom 61. Components of a backlight are housed within the area of the bottom 61. The backlight includes, in addition to the light source, a light guide plate, a diffusion plate, a condensing plate, and the like that are layered, for example. The backlight illuminates planar light towards the display panel 10.

In the example of FIG. 1C, there is no side wall on one side of the bottom 61. The bracket 7 is disposed on a side of the chassis 6 (bottom 61) and constitutes a portion of the side walls of the case. The bracket 7 has an L shape in a cross-sectional view, and extends along one side of the bottom 61 of the chassis 6. The bracket 7 includes a side wall portion 71 and a beam portion 72 that is formed continuously with the side wall portion 71. In this example, the angle between the side wall portion 71 and the beam portion 72 is substantially a right angle.

The bracket 7 can be formed by press working one metal plate made of iron, stainless steel, or the like, for example. In such a case, both the side wall portion 71 and the beam portion 72 are in the form of a plate having the same thickness, are continuous with each other, and are made of the same material.

The side wall portion 71 is a plate-shaped portion that rises from rear to front and extends along one side of the bottom surface of the chassis 6. A portion of the main surface of the side wall portion 71 abuts the end face (side face) of the bottom surface of the chassis 6. The beam portion 72 is a plate-shaped portion that is formed continuously with the front end of the side wall portion 71, protrudes towards the inside of the chassis 6, and extends along on side of the bottom 61 of the chassis 6. In the example of FIG. 1C, the beam portion 72 fits into the recesses formed in the side walls 62 and 64 of the chassis 6.

The bracket 7 is fixed to the chassis 6 by screws, for example. The screws join the beam portion 72 to the front surfaces of the side walls 62 and 64 of the chassis 6, or join the side wall portion 71 to the end face (side face) of the bottom 61 of the chassis 6. The bracket 7 may be bonded to the chassis 6 by an adhesive portion (cured adhesive or adhesive tape) in addition to or instead of screws. A side wall lower than the other side walls 62, 63, and 64 may be formed on the side to which the bracket 7 is fixed.

In this example, only one bracket 7 is fixed to the chassis 6. In another example, a plurality of brackets may be fixed to the respective sides of the chassis 6. On the side of the chassis 6 to which the bracket is fixed, no side wall is formed, or a side wall lower than the fixed bracket is formed. The plurality of brackets may be individual components or may be a portion of one component surrounding the plurality of sides in a plan view.

As depicted in FIG. 1B, the display panel 10 is held by the front surface plate 3 in a suspended state in the space inside the case, which is constituted of the chassis 6 and the bracket 7. The display panel 10 is separated from the chassis 6 and the bracket 7, which house the backlight.

The display panel 10 in this example is a liquid crystal panel. The display panel 10 includes a TFT (thin film transistor) substrate 11, a CF (color filter) substrate 12, a front polarizing plate (polarizer) 13A, and a rear polarizing plate 13B. These elements are layered, and in the example depicted in FIG. 1B, are disposed in the order of the polarizing plate 13B, the TFT substrate 11 (rear substrate), the CF substrate 12 (front substrate), and the polarizing plate 13A, from the rear.

The TFT substrate 11 and the CF substrate 12 are disposed to the front of the backlight in the chassis 6. The TFT substrate 11 and the CF substrate 12 are layered and bonded by a sealing member. The CF substrate 12 is a substrate opposing the TFT substrate 11. A liquid crystal material is sealed between the TFT substrate 11 and the CF substrate 12. The CF substrate 12 is a substrate disposed to the front of the TFT substrate 11.

In this example, the TFT substrate 11 and the CF substrate 12 are rectangular. The substrates may alternatively have another outer shape. The TFT substrate 11 and the CF substrate 12 each have a front main surface, a rear main surface, and four side end faces that surround these main surfaces.

The TFT substrate 11 includes an insulating substrate and a TFT array circuit formed on the front main surface of the insulating substrate. The polarizing plate 13B is fixed to the rear main surface of the insulating substrate. The CF substrate 12 includes a color filter layer of a plurality of colors formed on the rear main surface of an insulating substrate. The polarizing plate 13A is fixed to the front main surface of the insulating substrate.

The main surfaces of the display panel 10 are the surfaces of the display panel 10 as seen from the front-rear direction, and can be constituted of surfaces of a plurality of components. The front main surface of the display panel 10 includes the front main surface of the polarizing plate 13A, a portion of the front main surface of the CF substrate 12, and a portion of the front main surface of the TFT substrate 11, for example.

At some sides of the display panel 10, the TFT substrate 11 protrudes further outward than the CF substrate 12. In this example, the TFT substrate 11 protrudes further outward than the CF substrate 12 at only one side of the display panel 10. At the other three sides, the end faces (side faces) of the TFT substrate 11 are flush with the end faces (side faces) of the CF substrate 12.

An FPC 21 (flexible printed circuit) is connected at the protruding portion of the front main surface of the TFT substrate 11. The FPC 21 is a flexible cable that is connected to a circuit board 22 disposed to the outside of the chassis 6, and transmits signals between the circuit board 22 and the TFT substrate 11. The TFT substrate 11 may protrude beyond the CF substrate 12 at a plurality of sides, and an FPC may be connected at each of the protruding portions of the surface.

The TFT substrate 11 controls the transmission amount of light from the backlight at each pixel in the display region under the control of a controller mounted on the circuit board 22. In the CF substrate 12, the color filters for the respective pixels in the color filter layer selectively allow through light of specific colors among the light from the TFT substrate 11.

The CF substrate 12 may be an opposite substrate that does not have a color filter layer. The control mode for the liquid crystals may be any one of the following: twisted nematic (TN), vertical alignment (VA), in-plane switching (IPS), fringe field switching (FFS), or the like. The display panel 10 may be of a different type than a liquid crystal display panel, and may be an OLED (organic light emitting diode) panel, for example.

As depicted in FIG. 1B, a transparent rectangular front surface plate 3 is disposed to the front of the display panel 10. The intermediate panel 4 is rectangular and is disposed between the front surface plate 3 and the display panel 10. The sides of the intermediate panel 4 are parallel, respectively, to the sides of the display panel 10. In a plan view, at least some of the sides of the intermediate panel 4 are to the inside of the sides of the display panel 10.

In the example of FIGS. 1A and 1B, the side of the intermediate panel 4 facing the bracket 7 is positioned to the inside of the side of the TFT substrate 11, CF substrate 12, and polarizing plate 13A facing the bracket 7. The side of the intermediate panel 4 which is opposite to the side of the intermediate panel 4 facing the bracket 7 is further to the outside of the side defining the outer shape of the display panel 10 (side of the CF substrate 12 or TFT substrate 11). In the example of FIG. 1B, the side face of the intermediate panel 4 abuts the beam portion 72 of the bracket 7. Also, the side face of the intermediate panel 4 abuts the inner surface of the side wall 63 of chassis 6.

The display panel 10 is bonded to the front surface plate 3 with the intermediate panel 4 therebetween. A transparent optical elasticity resin layer 5B is present between the intermediate panel 4 and the front surface plate 3. The optical elasticity resin layer 5B is bonded to the front main surface (front surface) of the intermediate panel 4 and the rear main surface (rear surface) of the front surface plate 3, and bonds together the intermediate panel 4 and the front surface plate 3. In the example of FIG. 1B, the optical elasticity resin layer 5B is bonded to a portion of the front surface of the intermediate panel 4 and the rear surface of the front surface plate 3.

A transparent optical elasticity resin layer 5A is present between the display panel 10 and the intermediate panel 4. The optical elasticity resin layer 5A is bonded to the front main surface (front surface) of the display panel 10 (polarizing plate 13A) and the rear main surface (rear surface) of the intermediate panel 4, and bonds together the display panel 10 and the intermediate panel 4. In the example of FIG. 1B, the optical elasticity resin layer 5A is bonded to a portion of the front surface of the display panel 10 (polarizing plate 13A) and the rear surface of the intermediate panel 4.

The optical elasticity resin layers 5A and 5B are formed so as to cover the entirety of the display region of the display panel 10 in a plan view, for example. The optical elasticity resin layers 5A and 5B are an acrylic or silicon resin, for example. The optical elasticity resin layers 5A and 5B are made of an optical clear resin (OCR) that is a liquid resin cured by UV light, heat, moisture, or the like, for example. The optical elasticity resin layers 5A and 5B may alternatively be made of an optical clear adhesive (OCA). There is no special limitation on the color or degree of transparency of the optical elasticity resin layers 5A and 5B.

As depicted in FIG. 1B, the display panel 10 is suspended from the front surface plate 3 by the intermediate panel 4 and the optical elasticity resin layers 5A and 5B. The display panel 10 is in contact with the optical elasticity resin layer 5A and separated from the chassis 6 and the bracket 7. By this structure, as a result of pressure being applied on the front surface plate 3, the display panel 10 is pressed against the chassis 6 or the bracket 7, and it is possible to mitigate a decrease in display quality caused by the resulting stress.

The front surface plate 3 is bonded to the bracket 7 and the chassis 6, which houses the backlight, by double-sided tapes 8A and 8B (adhesive layer or adhesive portion). In the example of FIG. 1B, the double-sided tape 8A is bonded to the rear surface of the front surface plate 3 and the front main surface of the beam portion 72 of the bracket 7. Similarly, the double-sided tape 8B is bonded to the rear surface of the front surface plate 3 and the front surface of the side walls 62, 63, and 64 of the chassis 6. The front surface plate 3 is supported (held) by the beam portion 72 of the bracket 7 and the side walls 62, 63, and 64 of the chassis 6. The bonding strength of the double-sided tapes 8A and 8B is greater than that of the optical elasticity resin layers 5A and 5B.

In the example depicted in FIGS. 1A and 1C, the beam portion 72 has a rectangular shape as seen from the front. The widest main surfaces of the beam portion 72 face the front-rear direction. The beam portion 72 is disposed to the rear of the front surface plate 3, and as seen from the front, the front surface plate 3 covers the front surface of the beam portion 72. The outer sides of the beam portion 72 are positioned to the inside of the sides of the front surface plate 3. The beam portion 72 extends along a side of the main surface of the front surface plate 3 and overlaps (a portion of) the peripheral region of the main surface of the front surface plate 3.

Details of the cross-sectional structure of portions including the bracket 7 will be described in detail with reference to FIG. 1D. The beam portion 72 protrudes to the inside of the inside surface (inner main surface) of the side wall 71, along the rear surface of the front surface plate 3. The inner surface of the side wall portion 71 is the left surface in FIG. 1D. The inner surface of the side wall portion 71 is positioned to the inside of the outer peripheral edge of the front surface plate 3.

The beam portion 72 of the bracket 7 extends from the side wall portion 71 to the space between the front surface plate 3 and the polarizing plate 13A. The tip of the beam portion 72 is positioned between the front surface plate 3 and the polarizing plate 13A. A thickness T1 of the beam portion 72 is less than a gap T2 between the rear surface of the front surface plate 3 and the front surface of the polarizing plate 13A.

More specifically, the sum of the thickness T1 of the beam portion 72 and the thickness of the double-sided tape 8A is less than the gap T2 between the rear main surface of the front surface plate 3 and the front main surface of the polarizing plate 13A. The thickness T1 of the beam portion 72 is the front-rear dimension of the beam portion 72. In this example, the thickness T1 of the beam portion 72 is uniform.

The adhesive region of the double-sided tape 8A includes at least a portion of the region between the front surface plate 3 and the polarizing plate 13A on the front surface of the beam portion 72. In the example of FIG. 1D, the adhesive region of the double-sided tape 8A reaches the inner end of the front surface of the beam portion 72. Also, the adhesive region of the double-sided tape 8A reaches the outer end of the front surface of the beam portion 72. In other words, the double-sided tape 8A covers the entire front surface of the beam portion 72 facing the front surface plate 3.

The beam portion 72 protrudes inward from the side wall portion 71 and enables a reduction in width of a frame region A1 while maintaining an adhesive region between the beam portion 72 and the front surface plate 3.

In particular, the beam portion 72 reaches the space between the front surface plate 3 and the polarizing plate 13A, and thus, the same bonding area can be maintained in the narrower frame region A1. The space between the front surface plate 3 and the polarizing plate 13A is also the space between the front surface plate 3 and the TFT substrate 11 or CF substrate 12.

As depicted in FIG. 1D, ends of the polarizing plate 13A, the CF substrate 12, the TFT substrate 11, and the polarizing plate 13B are present between the beam portion 72 and the bottom 61 of the chassis 6. The rear surface of the beam portion 72 faces a portion (end region) of the main surfaces of the polarizing plate 13A, CF substrate 12, and TFT substrate 11.

The TFT substrate 11 protrudes further towards the side wall portion 71 than the CF substrate 12. The side (end face) of the TFT substrate 11 facing the side wall portion 71 is closer to the side wall portion 71 than the side (end face) of the CF substrate 12 facing the side wall portion 71. In a plan view, a portion of the front surface of the TFT substrate 11 is exposed outside of the CF substrate 12 and faces the rear surface of the beam portion 72. One end of the FPC 21 is connected to this exposed surface of the TFT substrate 11.

The FPC 21 is drawn to the outside between the bracket 7 and the bottom 61 of the chassis 6, and is connected to the circuit board 22 disposed on the rear side of the chassis 6. The bracket 7 is disposed at a position facing the FPC 21, and thus, it is possible to easily draw the FPC 21 to the outside from between the chassis 6 and the bracket 7. By drawing the FPC 21 to the circuit board 22 outside of the case without passing between the front surface plate 3 and the bracket 7, it is possible to prevent a decrease in the area of the adhesive region of the front surface plate 3.

Figure 2A:
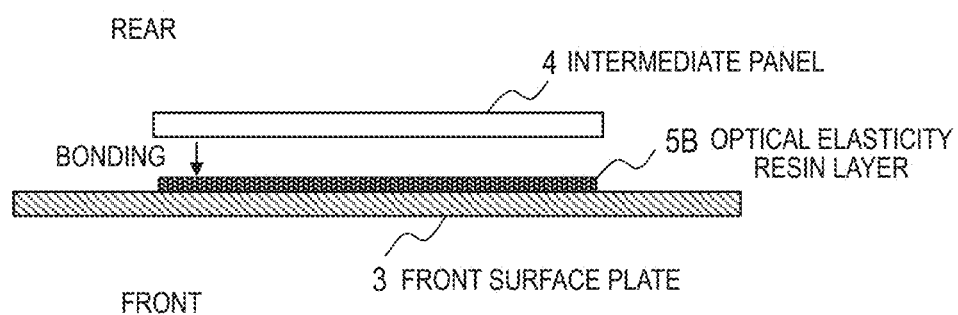
FIG. 2A depicts an assembly step for the display device according to Embodiment 1.

Below, the method for assembling (method for manufacturing) the display device will be described. FIGS. 2A to 2D respectively depict assembly steps for the display device. As depicted in FIG. 2A, the assembly of the display device starts with coating the rear surface of the front surface plate 3 with an optical elasticity resin in order to form the optical elasticity resin layer 5B thereon. The intermediate panel 4 and the front surface plate 3 are bonded together by the optical elasticity resin layer 5B. Depending on the material of the optical elasticity resin, the optical elasticity resin is cured as necessary by heat, UV light, or the like.

Figure 2B:
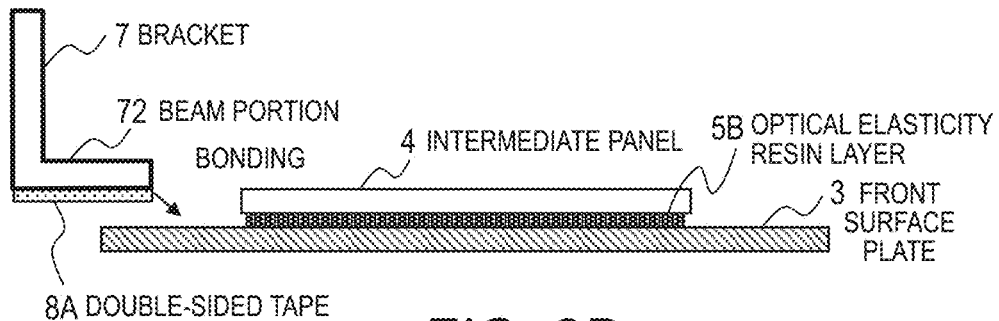
FIG. 2B depicts an assembly step for the display device according to Embodiment 1.

Next, as depicted in FIG. 2B, the bracket 7 having the beam portion 72, the front surface of which has bonded thereto the double-sided tape 8A, is prepared. With the double-sided tape 8A facing the rear surface of the front surface plate 3, the bracket 7 is positioned using the intermediate panel 4 and bonded to the rear surface of the front surface plate 3. Positioning is performed by abutting the end face of the beam portion 72 to the end face of the intermediate panel 4.

Figure 2C:
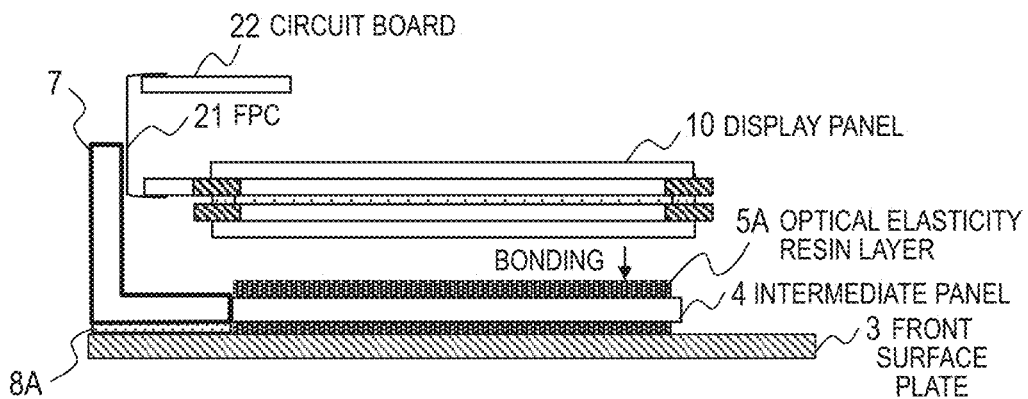
FIG. 2C depicts an assembly step for the display device according to Embodiment 1.

Next, as depicted in FIG. 2C, the rear surface of the intermediate panel 4 is coated with an optical elasticity resin in order to form the optical elasticity resin layer 5A thereon. The front surface plate 3 (intermediate panel 4) and the display panel 10, to which the FPC 21 and the circuit board 22 are mounted, are bonded together by the optical elasticity resin layer 5A. The display panel 10 is arranged on the optical elasticity resin layer 5A such that the end portion of the polarizing plate 13A overlaps the end portion of the beam portion 72. Depending on the material of the optical elasticity resin, the optical elasticity resin is cured as necessary by heat, UV light, or the like.

Figure 2D:
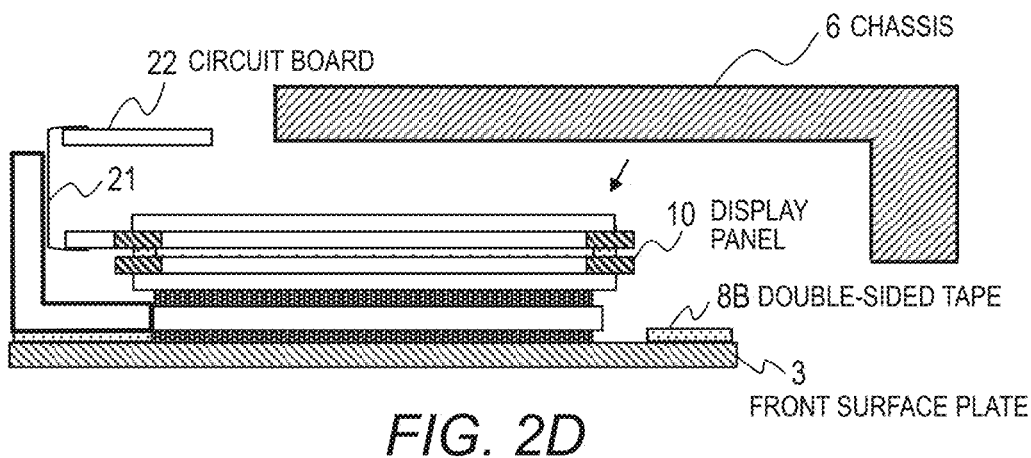
FIG. 2D depicts an assembly step for the display device according to Embodiment 1.

Next, as depicted in FIG. 2D, the double-sided tape 8B is bonded to the rear surface of the front surface plate 3. Furthermore, the chassis 6 and the front surface plate 3 are bonded to each other such that the front surface of the side walls 62, 63, and 64 of the chassis 6 is bonded to the double-sided tape 8B. When performing such bonding, the circuit board 22 is held in a manner such that the FPC 21 is sandwiched between the chassis 6 and the bracket 7. Additionally, the chassis 6 and the bracket 7 are fixed to each other by screws or the like (not depicted).

As described above, after bonding the bracket 7 to the rear surface of the front surface plate 3, the display panel 10 is attached, thereby allowing for easy assembly of the display device in a manner such that a portion of the beam portion 72 is positioned between the display panel 10 and the front surface plate 3.

Embodiment 2

Figure 3A:
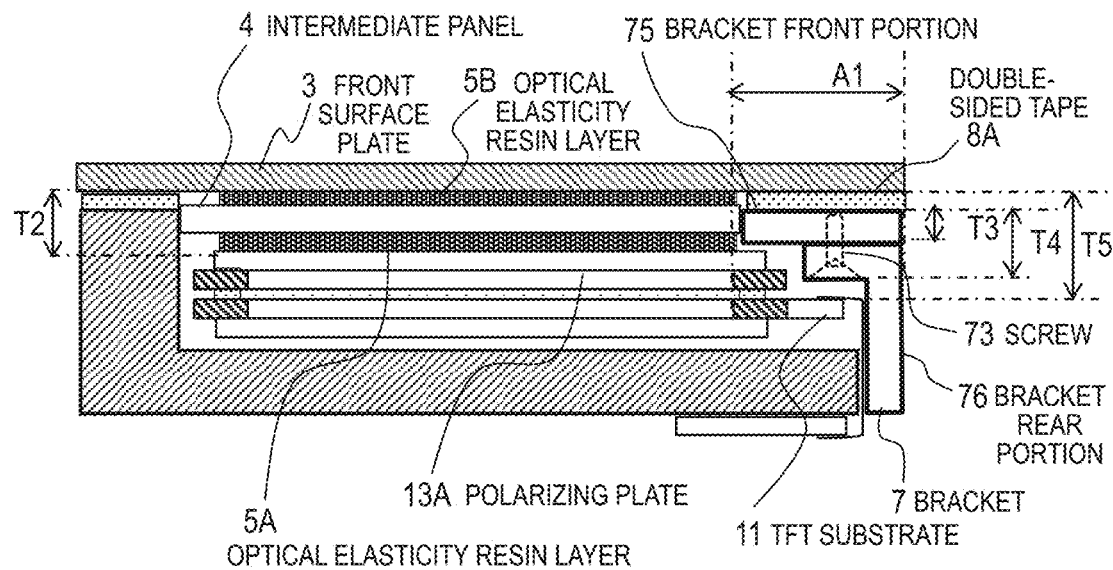
FIG. 3A is a cross-sectional view depicting a configuration of the display device according to Embodiment 2.

A display device of Embodiment 2 will be described with reference to FIGS. 3A to 4D. Differences from Embodiment 1 will be primarily described below. FIG. 3A is a cross-sectional view depicting a configuration of the display device of Embodiment 2, and FIG. 3B is a cross-sectional view depicting the structure of a bracket 7 of Embodiment 2.

Figure 3B:
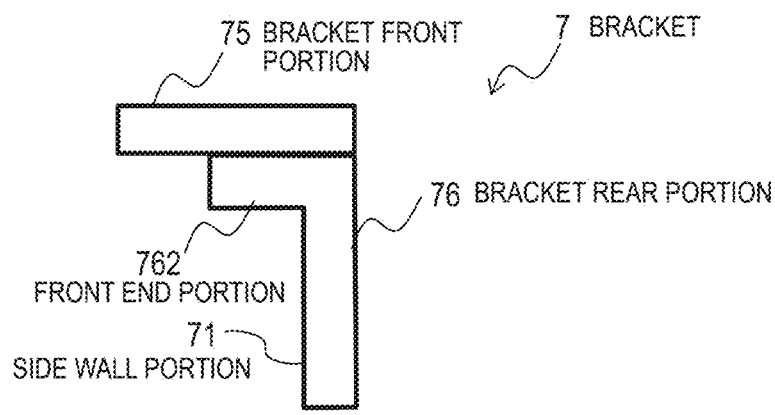
FIG. 3B is a cross-sectional view depicting the structure of a bracket according to Embodiment 2.

As depicted in FIG. 3B, the bracket 7 is constituted of a bracket front portion 75 and a bracket rear portion 76. The bracket rear portion 76 is a component with an L-shaped cross-section, and includes the side wall portion 71 and a front end portion 762 that is continuous with the front side end of the side wall portion 71. The bracket rear portion 76 can be formed by press working one metal plate made of iron, stainless steel, or the like, for example.

The explanation from Embodiment 1 is applicable to the side wall portion 71. The front end portion 762 protrudes to the inside of the case from the side wall portion 71. The angle between the side wall portion 71 and the front end portion 762 is substantially a right angle in this example. The front end portion 762 protrudes to the inside of the inside surface (inner main surface) of the side wall portion 71, along the rear main surface of the front surface plate 3. In the example of FIG. 3A, the front end portion 762 protrudes to the space between the display panel 10 and the front surface plate 3, and specifically, protrudes to the space between the TFT substrate 11 and the front surface plate 3. The front end portion 762 extends along the side of the front surface plate 3. The width of the front end portion 762 is shorter than the height of the side wall portion 71, for example.

The bracket front portion 75 is disposed on the front surface of the front end portion 762. The front surface (front main surface) of the front end portion 762 opposes the rear surface (rear main surface) of the bracket front portion 75. The bracket front portion 75 is a plate made of a metal such as iron or stainless steel, for example. The fixed bracket front portion 75 and front end portion 762 constitute the beam portion of the bracket 7.

As depicted in FIG. 3A, the bracket front portion 75 is fixed to the front end portion 762 by screws 73, for example. For descriptive purposes, FIG. 3A depicts the screws 73 in a position overlapping the TFT substrate 11, but in reality, the screws 73 fix the bracket front portion 75 to the front end portion 762 in a position that does not overlap the display panel 10 in a plan view. The screws 73 pass through a penetrating hole formed in the front end portion 762 from the rear to the front, and are screwed into screw holes formed in the bracket front portion 75. The bracket front portion 75 may be disposed over the front end portion 762 with an adhesive portion therebetween, with the adhesive portion bonding the bracket front portion 75 to the front end portion 762.

The thickness of the bracket front portion 75 can be the same as or different from the thickness of the front end portion 762. The bracket front portion 75, the front end portion 762, and the side wall 71 are made of the same material, and have the same thickness.

In the example of FIGS. 3A and 3B, the bracket front portion 75 has a greater width than the front surface of the front end portion 762. The width is the dimension in the left-right direction of FIGS. 3A and 3B, and the bracket front portion 75 protrudes further inward (left side in FIGS. 3A, 3B) than the side wall portion 71 (inner main surface thereof) and also protrudes further inward than the front end portion 762.

The front surface of the bracket front portion 75 opposes the rear surface of the front surface plate 3, and a double-sided tape 8A is present therebetween. In the example of FIG. 3A, the double-sided tape 8A is bonded to the front surface of the bracket front portion 75 and the rear surface of the front surface plate 3. The adhesive region includes a region located further inward than the inner edge of the front end portion 762 and also includes the region between the front surface plate 3 and the polarizing plate 13A. The bonding region covers the area of the bracket front portion 75 from the outer edge to the inner edge.

It is possible to increase the bonding region between the bracket 7 and the front surface plate 3 towards the inside of the case and ensure a high bonding strength to the front surface plate 3 while reducing the frame region of the display device. In particular, in the example of FIGS. 3A and 3B, the bracket front portion 75 extends to the space between the polarizing plate 13A and the front surface plate 3, and can increase the narrow frame effect while ensuring a sufficient bonding region.

As depicted in FIG. 3A, a thickness T3 of the bracket front portion 75 is less than a gap T2 between the rear surface of the front surface plate 3 and the front surface of the polarizing plate 13A. More specifically, the sum of the thickness T3 of the bracket front portion 75 and the thickness of the double-sided tape 8A is less than the gap T2 between the rear main surface of the front surface plate 3 and the front surface of the polarizing plate 13A.

The front end portion 762 extends to the space between the TFT substrate 11 and the front surface plate 3. A sum T4 of the thicknesses of the front end portion 762 and the bracket front portion 75 (maximum thickness of the beam portion) is less than the gap T5 between the rear main surface of the front surface plate 3 and the front surface of the TFT substrate 11. More specifically, the sum T4 of the thicknesses of the front end portion 762 and the bracket front portion 75 is less than the gap T5 between the rear main surface of the front surface plate 3 and the front surface of the TFT substrate 11.

The beam portion constituted of the bracket front portion 75 and the front end portion 762 of the bracket rear portion 76 has an outer frame portion that is thicker than the inner portion inserted into the space between the front surface plate 3 and the polarizing plate 13A. The maximum thickness of the beam portion is greater than the maximum thickness of the side wall portion 71. As a result, it is possible to ensure a sufficient bonding area while increasing the rigidity of the bracket 7 (display device).

Figure 4A:
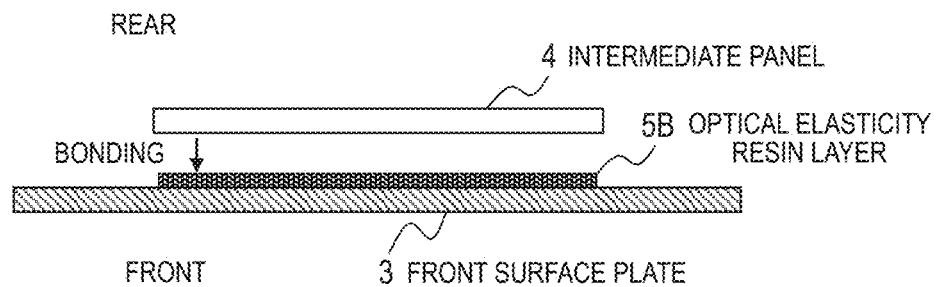
FIG. 4A depicts an assembly step for the display device according to Embodiment 2.

Below, the method for assembling (method for manufacturing) the display device of the present embodiment will be described. FIGS. 4A to 4D respectively depict assembly steps for the display device. The step of FIG. 4A is similar to the step depicted in FIG. 2A.

Figure 4B:
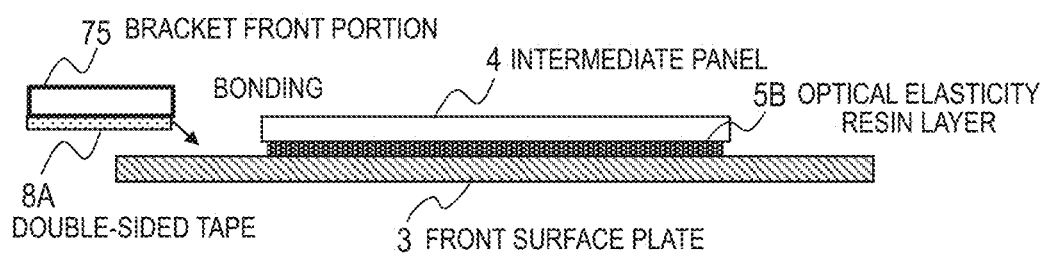
FIG. 4B depicts an assembly step for the display device according to Embodiment 2.

Next, as depicted in FIG. 4B, the bracket front portion 75, the front surface of which has bonded thereto the double-sided tape 8A, is prepared. With the double-sided tape 8A facing the rear surface of the front surface plate 3, the bracket front portion 75 is positioned using the intermediate panel 4 and bonded to the rear surface of the front surface plate 3. Positioning is performed by abutting the end face of the bracket front portion 75 to the end face of the intermediate panel 4.

Figure 4C:
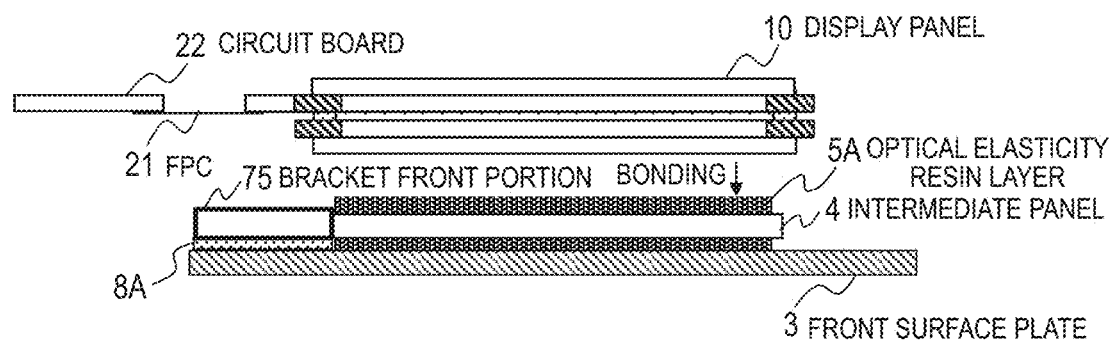
FIG. 4C depicts an assembly step for the display device according to Embodiment 2.

Next, as depicted in FIG. 4C, the rear surface of the intermediate panel 4 is coated with an optical elasticity resin in order to form the optical elasticity resin layer 5A thereon. The front surface plate 3 (intermediate panel 4) and the display panel 10, to which the FPC 21 and the circuit board 22 are mounted, are bonded together by the optical elasticity resin layer 5A.

The display panel 10 is arranged on the optical elasticity resin layer 5A such that the end portion of the polarizing plate 13A overlaps the end portion of the bracket front portion 75. Depending on the material of the optical elasticity resin, the optical elasticity resin is cured as necessary by heat, UV light, or the like. In the step depicted in FIG. 4C, there is no side wall portion 71 of the bracket. Thus, there is no need to greatly bend the FPC 21, which increases the ease of assembly.

Figure 4D:
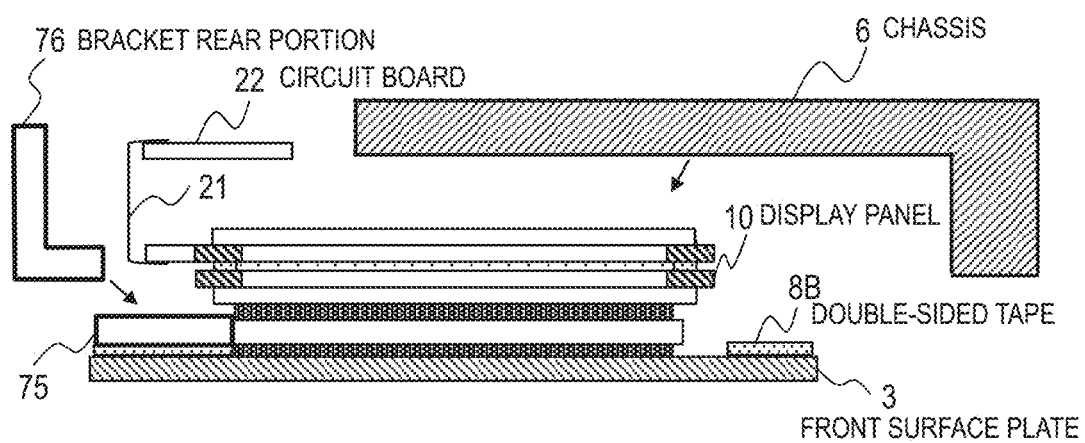
FIG. 4D depicts an assembly step for the display device according to Embodiment 2.

Next, as depicted in FIG. 4D, the double-sided tape 8B is bonded to the rear surface of the front surface plate 3. Furthermore, the chassis 6 and the front surface plate 3 are bonded to each other such that the front surface of the side walls 62, 63, and 64 of the chassis 6 is bonded to the double-sided tape 8B. Furthermore, the bracket rear portion 76 is fixed to the bracket front portion 75 and the chassis 6. The bracket rear portion 76 and the bracket front portion 75 are fixed by screws outside of the region overlapping the display panel 10, for example. The chassis 6 and the bracket rear portion 76 are screwed to each other, for example.

When attaching the bracket rear portion 76, the circuit board 22 is held in a manner such that the FPC 21 is sandwiched between the chassis 6 and the bracket 7. Either one of the bracket rear portion 76 and the chassis 6 may be attached first, but if the bracket rear portion is attached first, then there is a need to raise the circuit board 22 and insert the chassis 6, and thus, it would be easier to attach the chassis 6 first. As described above, by forming the bracket 7 of the bracket front portion 75 and the bracket rear portion 76, which are separate components, and attaching the display panel 10 behind the bracket front portion 75 and in front of the bracket rear portion 76, ease of assembly of the display device is improved.

Embodiment 3

Figure 5:
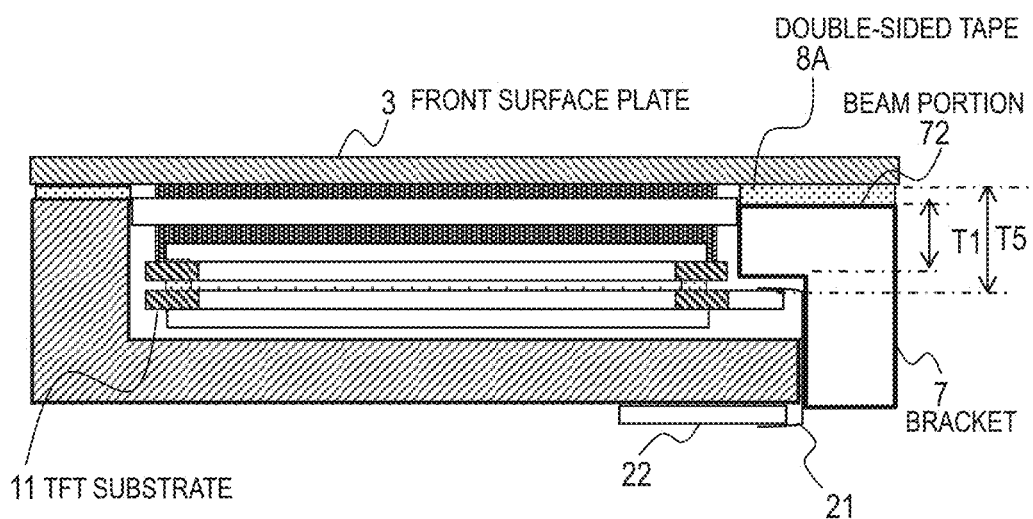
FIG. 5 is a cross-sectional view depicting a configuration of a display device according to Embodiment 3.

A display device of Embodiment 3 will be described with reference to FIG. 5. Differences from Embodiment 1 will be primarily described below. FIG. 5 is a cross-sectional view depicting a configuration of a display device according to Embodiment 3.

In the example depicted in FIG. 5, the beam portion 72 of the bracket 7 does not reach the space between the polarizing plate 13A and the front surface plate 3, but reaches the space between the TFT substrate 11 and the front surface plate 3. The inner end of the beam portion 72 is positioned between the TFT substrate 11 and the front surface plate 3.

A thickness T1 (maximum thickness) of the beam portion 72 is greater than a gap between the front surface of the polarizing plate 13A and the rear surface of the front surface plate 3, and less than a gap T5 between the front surface of the TFT substrate 11 and the rear surface of the front surface plate 3. More specifically, the sum of the thickness T1 of the beam portion 72 and the thickness of the double-sided tape 8A is less than the gap T5 between the front surface of the TFT substrate 11 and the rear surface of the front surface plate 3.

The maximum thickness of the beam portion 72 is greater than the maximum thickness of the side wall portion 71, and thus, it is possible to increase the rigidity of the bracket 7 (display device). Also, the beam portion 72 can reduce the effect of noise on circuits on the TFT substrate 11.

Embodiment 4

Figure 6:
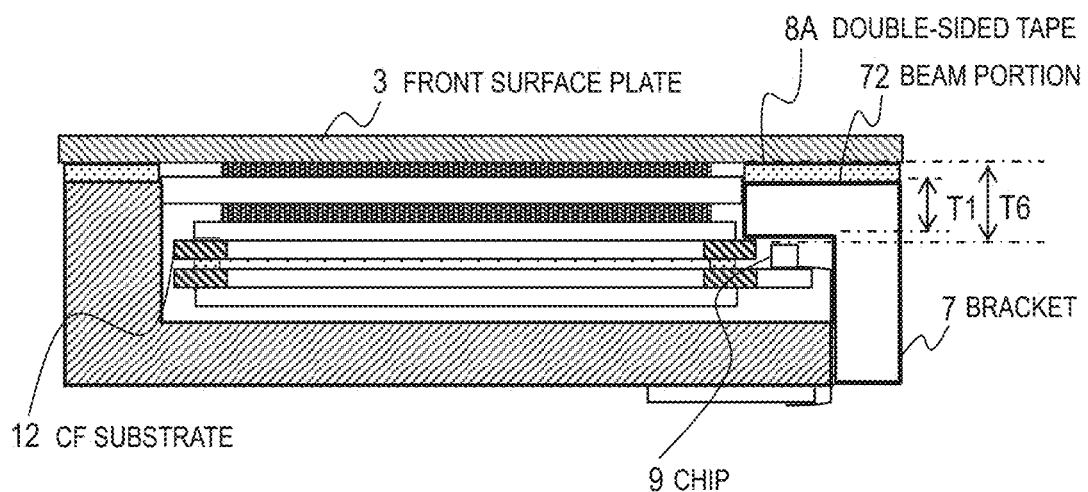
FIG. 6 is a cross-sectional view depicting a configuration of a display device according to Embodiment 4.

A display device of Embodiment 4 will be described with reference to FIG. 6. Differences from Embodiment 1 will be primarily described below. FIG. 6 is a cross-sectional view depicting a configuration of a display device according to Embodiment 4.

In the example depicted in FIG. 6, the beam portion 72 of the bracket 7 does not reach the space between the polarizing plate 13A and the front surface plate 3, but reaches the space between the CF substrate 12 and the front surface plate 3. The inner end of the beam portion 72 is positioned between the CF substrate 12 and the front surface plate 3.

A thickness T1 (maximum thickness) of the beam portion 72 is greater than a gap between the front surface of the polarizing plate 13A and the rear surface of the front surface plate 3, and less than a gap T6 between the front surface of the CF substrate 12 and the rear surface of the front surface plate 3. More specifically, the sum of the thickness T1 of the beam portion 72 and the thickness of the double-sided tape 8A is less than the gap T6 between the front surface of the CF substrate 12 and the rear surface of the front surface plate 3.

The maximum thickness of the beam portion 72 is greater than the maximum thickness of the side wall portion 71, and thus, it is possible to increase the rigidity of the bracket 7 (display device). If a driver IC chip 9 for driving the display panel is present on the TFT substrate 11, then the beam portion 72 can reduce the effect of noise on the chip 9 and effectively dissipate heat from the chip 9, thereby preventing malfunctioning of the chip 9.

Embodiment 5

Figure 7:
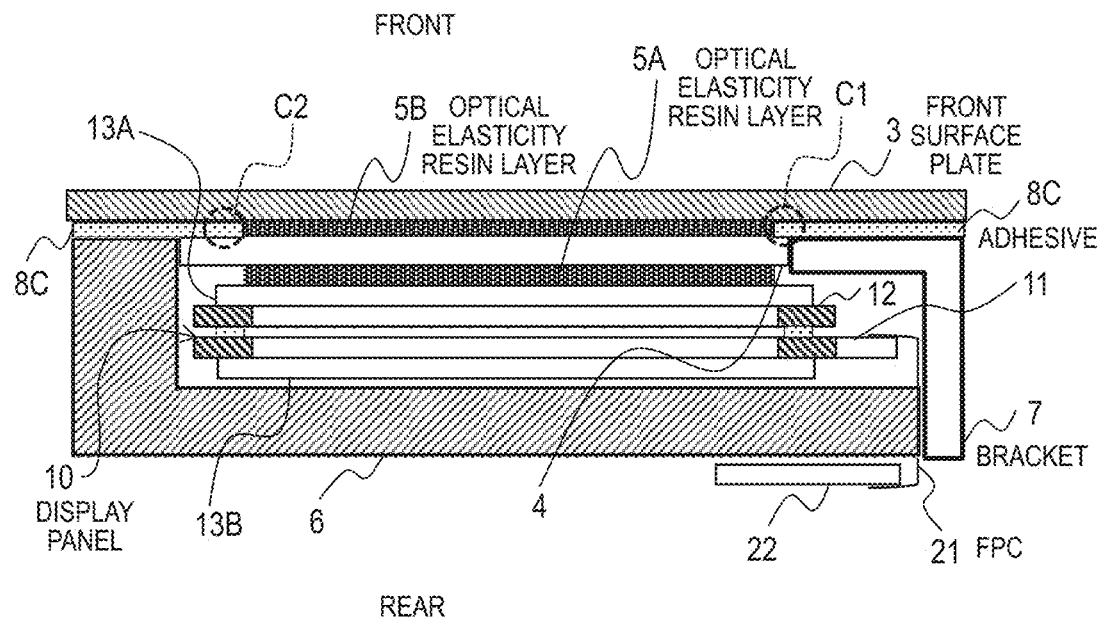
FIG. 7 is a cross-sectional view depicting a configuration of a display device according to Embodiment 5.

A display device of Embodiment 5 will be described with reference to FIGS. 7 to 8D. Differences from Embodiment 1 will be primarily described below. FIG. 7 is a cross-sectional view depicting a configuration of a display device according to Embodiment 5.

As depicted in FIG. 7, the front surface plate 3 is bonded to the chassis 6 and the bracket 7 by a cured adhesive 8C (adhesive layer or adhesive portion). The adhesive 8C can be made of a silicon resin or acrylic resin that is cured by UV light, heat, moisture, or the like.

The bonding region of the adhesive 8C includes regions C1 and C2 between the intermediate panel 4 and the front surface plate 3. The thickness of the adhesive 8C is the same as the thickness of the optical elasticity resin layer 5B. The bonding strength of the adhesive 8C is greater than that of the optical elasticity resin layers 5A and 5B. By the adhesive 8C being provided between the intermediate panel 4 and the front surface plate 3, the bonding strength between the front surface plate 3 and the intermediate panel 4 can be reinforced.

Figure 8A:
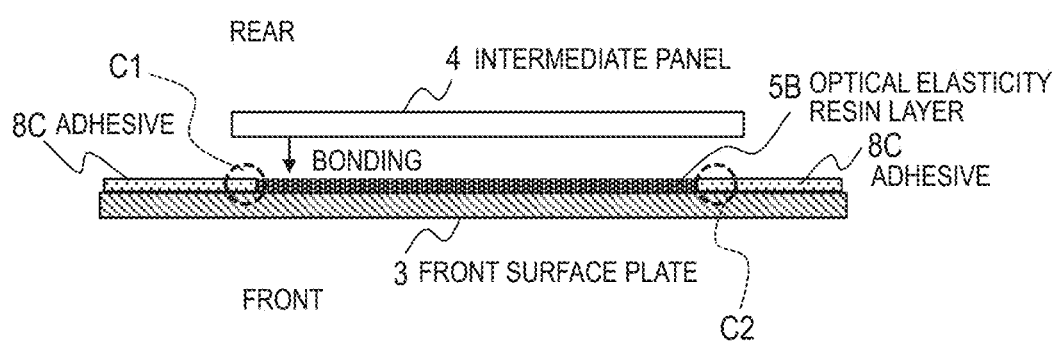
FIG. 8A depicts an assembly step for the display device according to Embodiment 5.

Below, the method for assembling (method for manufacturing) the display device will be described. FIGS. 8A to 8D respectively depict assembly steps for the display device. As depicted in FIG. 8A, the assembly of the display device starts with coating the rear surface of the front surface plate 3 with an optical elasticity resin in order to form the optical elasticity resin layer 5B thereon.

Furthermore, the region outside the optical elasticity resin layer 5B is coated with the adhesive 8C. In the example of FIG. 8A, the adhesive 8C is applied such that the adhesive 8C is in contact with the optical elasticity resin layer 5B. Furthermore, the intermediate panel 4 and the front surface plate 3 are bonded together so as to sandwich the optical elasticity resin layer 5B and the portion of the adhesive 8C surrounding the optical elasticity resin layer 5B. The optical elasticity resin is cured as necessary by UV light, for example.

Figure 8B:
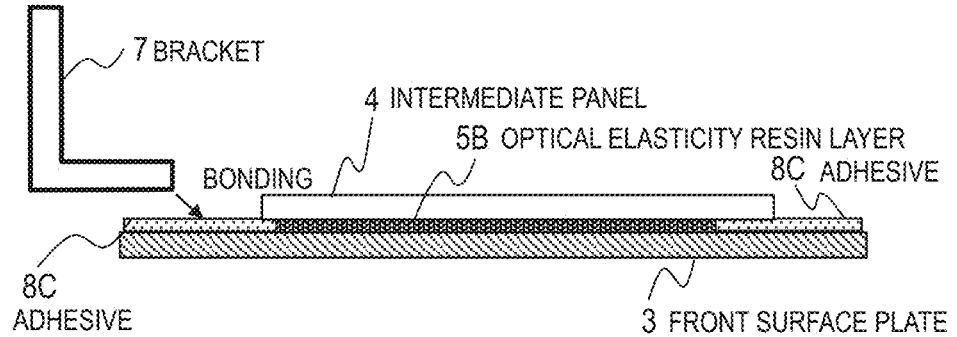
FIG. 8B depicts an assembly step for the display device according to Embodiment 5.

Next, as depicted in FIG. 8B, the bracket 7 is arranged on the adhesive 8C while positioning the bracket 7 using the intermediate panel 4. Positioning is performed by abutting the end face of the beam portion 72 to the end face of the intermediate panel 4.

Figure 8C:
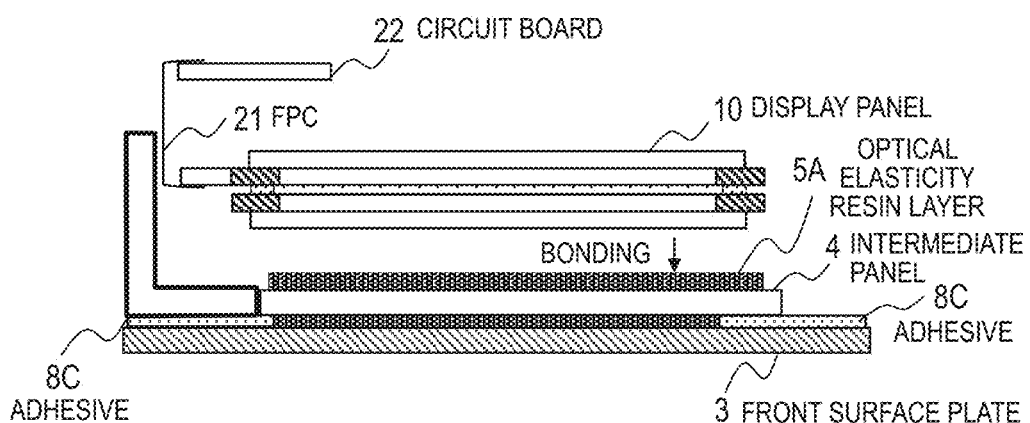
FIG. 8C depicts an assembly step for the display device according to Embodiment 5.

Next, as depicted in FIG. 8C, the rear surface of the intermediate panel 4 is coated with an optical elasticity resin in order to form the optical elasticity resin layer 5A thereon. The front surface plate 3 (intermediate panel 4) and the display panel 10, to which the FPC 21 and the circuit board 22 are mounted, are bonded together by the optical elasticity resin layer 5A. The optical elasticity resin is cured as necessary by UV light, for example.

Figure 8D:
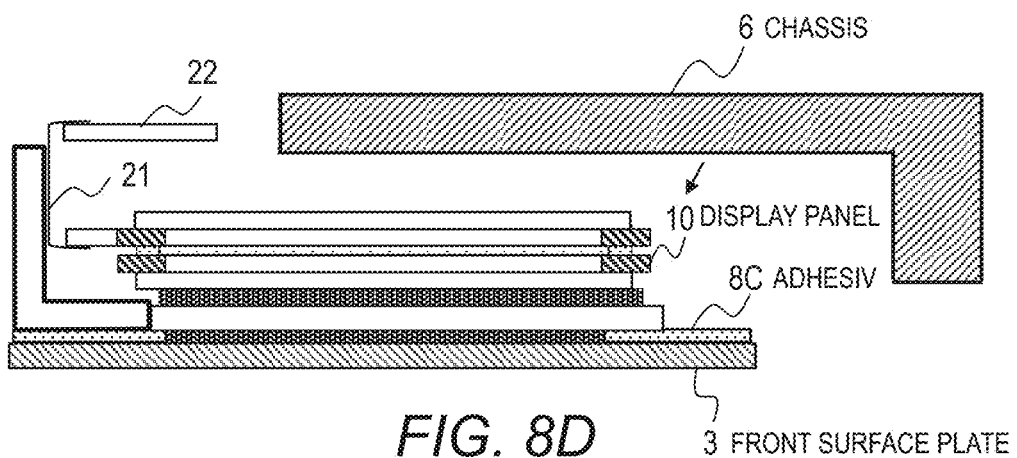
FIG. 8D depicts an assembly step for the display device according to Embodiment 5.

Next, as depicted in FIG. 8D, the chassis 6 and the front surface plate 3 are bonded to each other such that the front surface of the side walls 62, 63, and 64 of the chassis 6 is bonded to the adhesive 8C. When performing such bonding, the circuit board 22 is held in a manner such that the FPC 21 is sandwiched between the chassis 6 and the bracket 7. The adhesive 8C (and the optical elasticity resin) is cured as necessary by heat, for example. Additionally, the chassis 6 and the bracket 7 are fixed to each by screws or the like (not depicted). If the optical elasticity resin and the adhesive 8C are of a moisture-curable type, then the application of heat or UV light is unnecessary.

Embodiment 6

Figure 9:
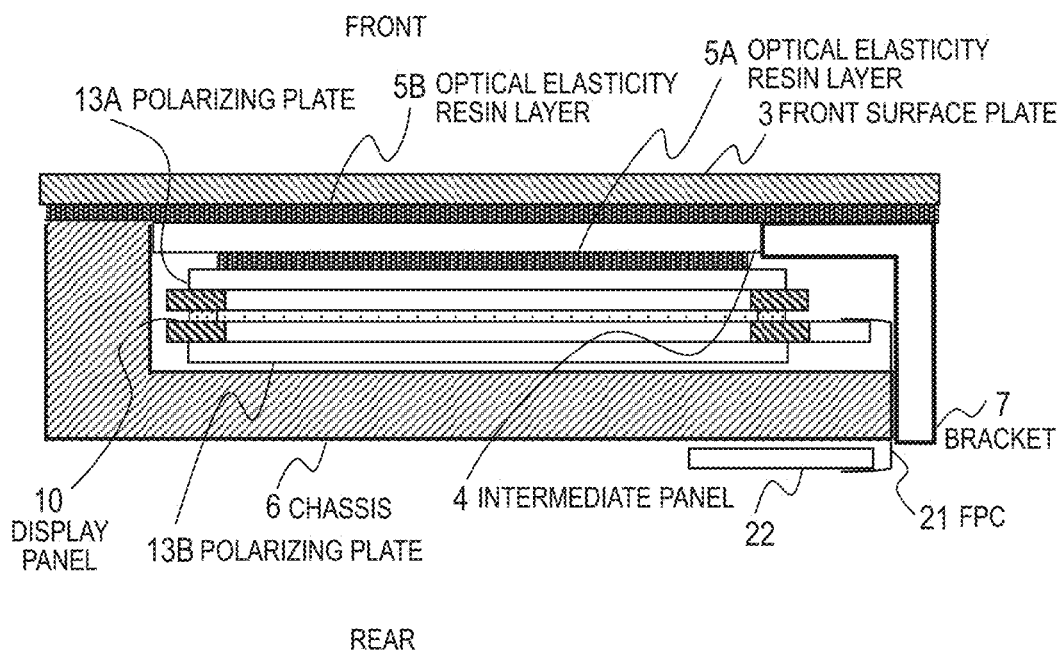
FIG. 9 is a cross-sectional view depicting a configuration of a display device according to Embodiment 6.

A display device of Embodiment 6 will be described with reference to FIGS. 9 to 10D. Differences from Embodiment 1 will be primarily described below. FIG. 9 is a cross-sectional view depicting a configuration of a display device according to Embodiment 6.

As depicted in FIG. 9, the front surface plate 3 is bonded to the chassis 6 and the bracket 7 by the optical elasticity resin layer 5B. The optical elasticity resin layer 5B is made of OCA, for example. By using a continuous optical elasticity resin layer 5B, it is possible to increase the ease of assembly for the display device by bonding the bracket 7 and the chassis 6, in addition to the intermediate panel 4, to the front surface plate 3.

Figure 10A:
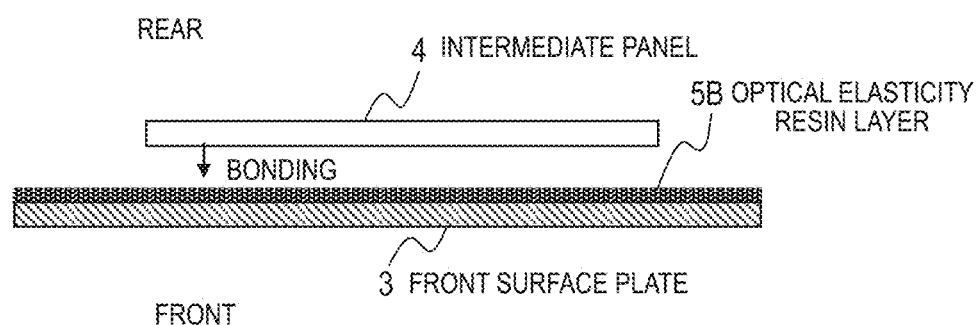
FIG. 10A depicts an assembly step for the display device according to Embodiment 6.

Below, the method for assembling (method for manufacturing) the display device will be described. FIGS. 10A to 10D respectively depict assembly steps for the display device. As depicted in FIG. 10A, the assembly of the display device starts with coating the rear surface of the front surface plate 3 with an optical elasticity resin in order to form the optical elasticity resin layer 5B thereon. The coating region includes a region where the chassis 6 and the bracket 7 are disposed, in addition to the region where the intermediate panel 4 is disposed. Additionally, the intermediate panel 4 and the front surface plate 3 are bonded together by the optical elasticity resin layer 5B.

Figure 10B:
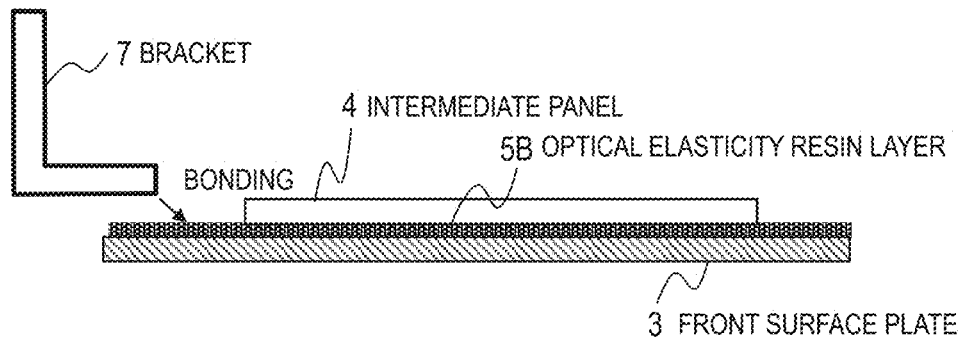
FIG. 10B depicts an assembly step for the display device according to Embodiment 6.
Figure 10C:
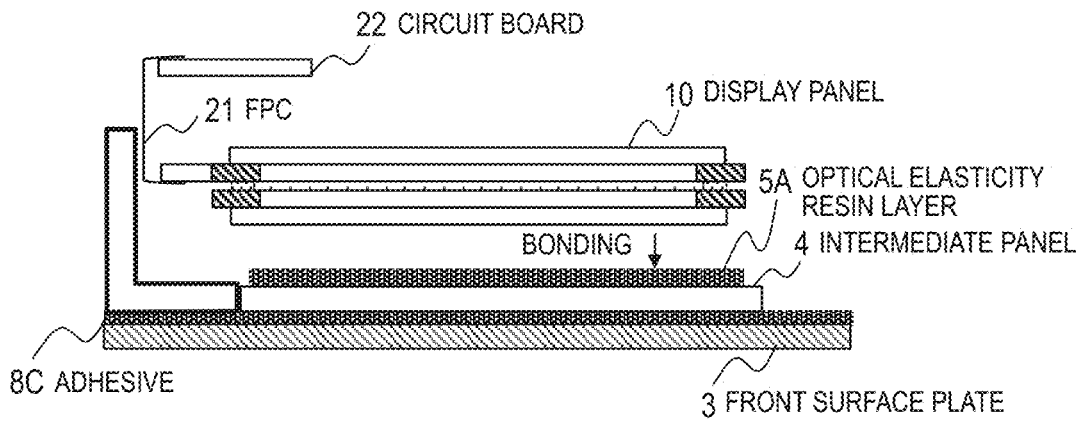
FIG. 10C depicts an assembly step for the display device according to Embodiment 6.

Next, as depicted in FIG. 10B, the bracket 7 is arranged on the optical elasticity resin layer 5B while positioning the bracket 7 using the intermediate panel 4. Next, as depicted in FIG. 10C, the rear surface of the intermediate panel 4 is coated with an optical elasticity resin in order to form the optical elasticity resin layer 5A thereon. The front surface plate 3 (intermediate panel 4) and the display panel 10, to which the FPC 21 and the circuit board 22 are mounted, are bonded together by the optical elasticity resin layer 5A.

Figure 10D:
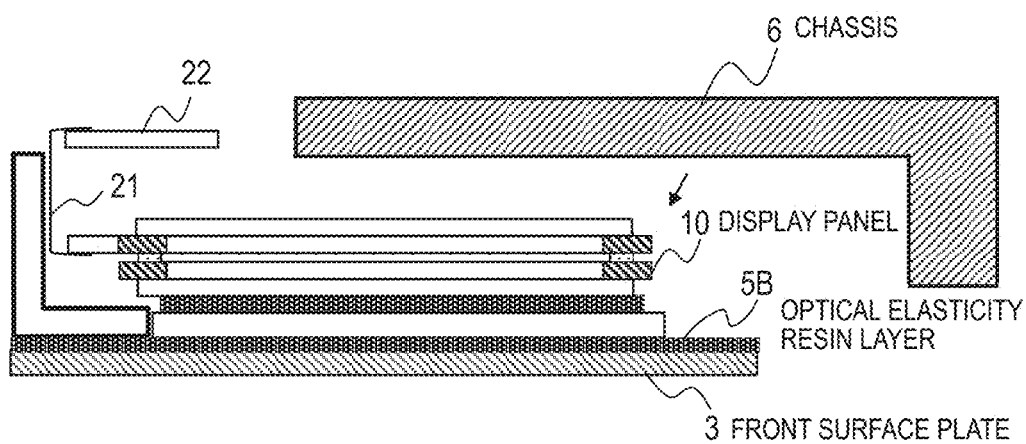
FIG. 10D depicts an assembly step for the display device according to Embodiment 6.

Next, as depicted in FIG. 10D, the chassis 6 and the front surface plate 3 are bonded to each other such that the front surface of the side walls 62, 63, and 64 of the chassis 6 is bonded to the optical elasticity resin layer 5B. Depending on the material of the optical elasticity resin, the optical elasticity resin is cured as necessary by heat, for example. Lastly, the chassis 6 and the bracket 7 are fixed to each by screws or the like (not depicted).

Embodiment 7

Figure 11:
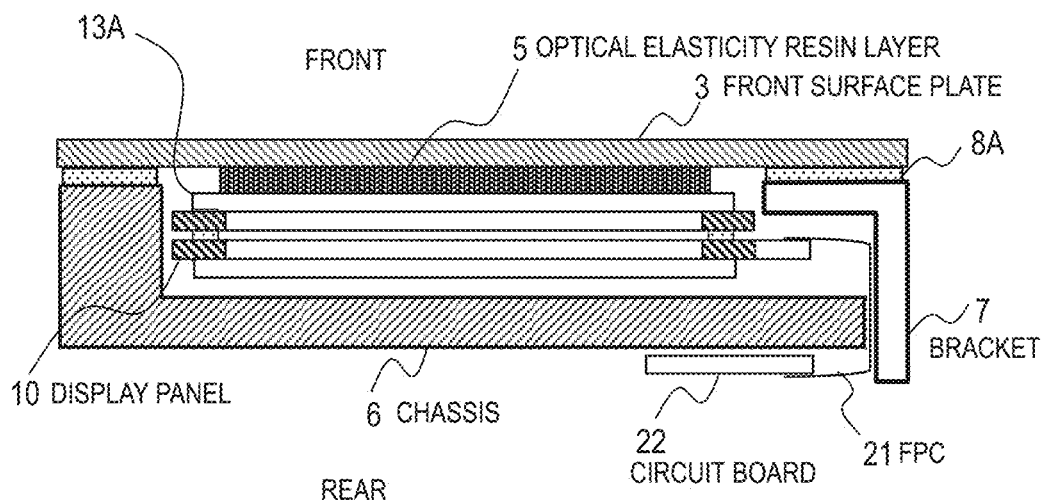
FIG. 11 is a cross-sectional view depicting a configuration of a display device according to Embodiment 7.
Figure 12A:
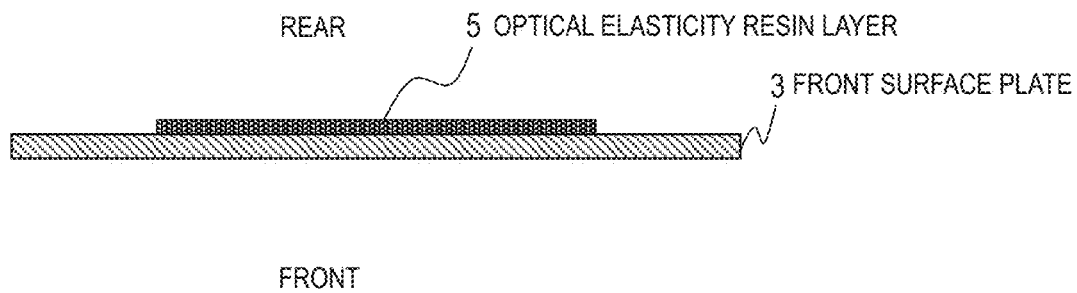
FIG. 12A depicts an assembly step for the display device according to Embodiment 7.

A display device of Embodiment 7 will be described with reference to FIGS. 11 to 12D. Differences from Embodiment 1 will be primarily described below. FIG. 11 is a cross-sectional view depicting a configuration of a display device according to Embodiment 7.

By contrast to the configuration of Embodiment 1, the intermediate panel 4 and the optical elasticity resin layer 5B are omitted. A transparent optical elasticity resin layer 5 is present between the display panel 10 and the front surface plate 3. The optical elasticity resin layer 5 is bonded to the front main surface (front surface) of the display panel 10 and the rear main surface (rear surface) of the front surface plate 3, and bonds together the display panel 10 and the front surface plate 3. By this configuration, it is possible to reduce the thickness and weight of the display device. The beam portion of the bracket 7 protrudes into the space between the TFT substrate 11 and the front surface plate 3. The inner end of the beam portion is positioned between the TFT substrate 11 and the front surface plate 3.

Below, the method for assembling (method for manufacturing) the display device will be described. FIGS. 12A to 12D respectively depict assembly steps for the display device. As depicted in FIG. 12A, the assembly of the display device starts with coating the rear surface of the front surface plate 3 with an optical elasticity resin in order to form the optical elasticity resin layer 5 thereon.

Figure 12B:
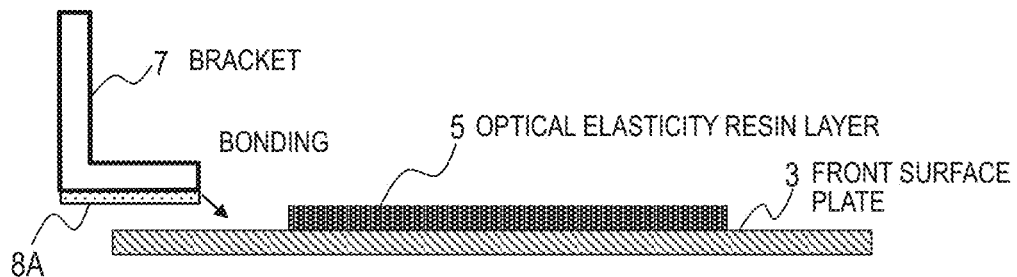
FIG. 12B depicts an assembly step for the display device according to Embodiment 7.

Next, as depicted in FIG. 12B, the bracket 7 having the beam portion 72, the front surface of which has bonded thereto the double-sided tape 8A, is prepared. With the double-sided tape 8A facing the rear surface of the front surface plate 3, the bracket 7 is bonded to the rear surface of the front surface plate 3.

Figure 12C:
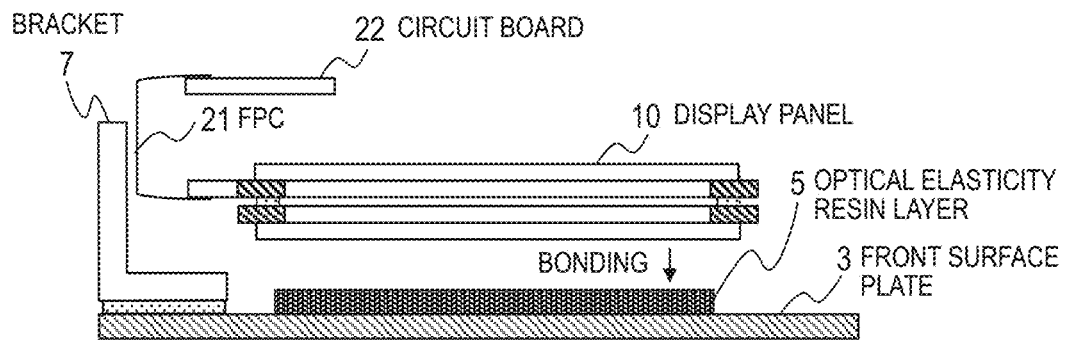
FIG. 12C depicts an assembly step for the display device according to Embodiment 7.
Figure 12D:
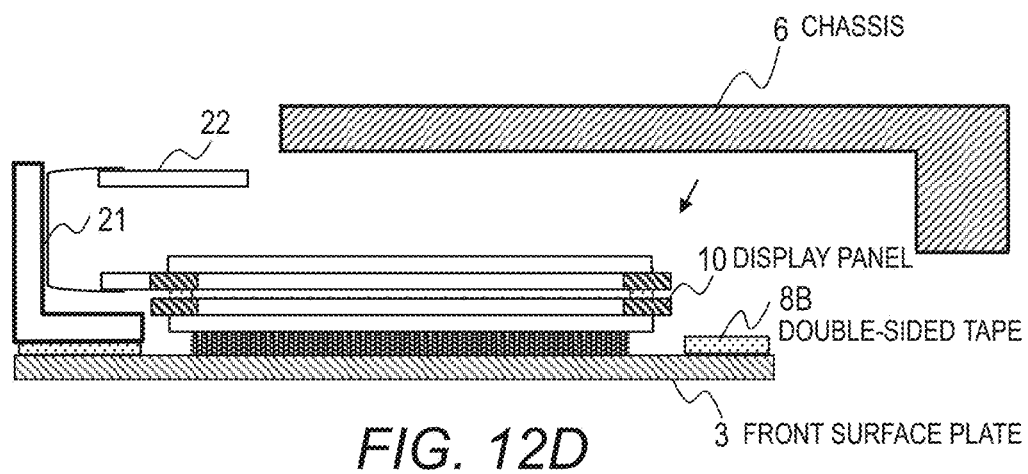
FIG. 12D depicts an assembly step for the display device according to Embodiment 7.

Next, as depicted in FIG. 12C, the front surface plate 3 and the display panel 10, to which the FPC 21 and the circuit board 22 are mounted, are bonded together by the optical elasticity resin layer 5. Depending on the material of the optical elasticity resin, the optical elasticity resin is cured as necessary by heat, UV light, or the like. Next, the step in FIG. 12D is performed. The step of FIG. 12D is similar to the step in FIG. 2D.

Embodiment 8

Figure 13:
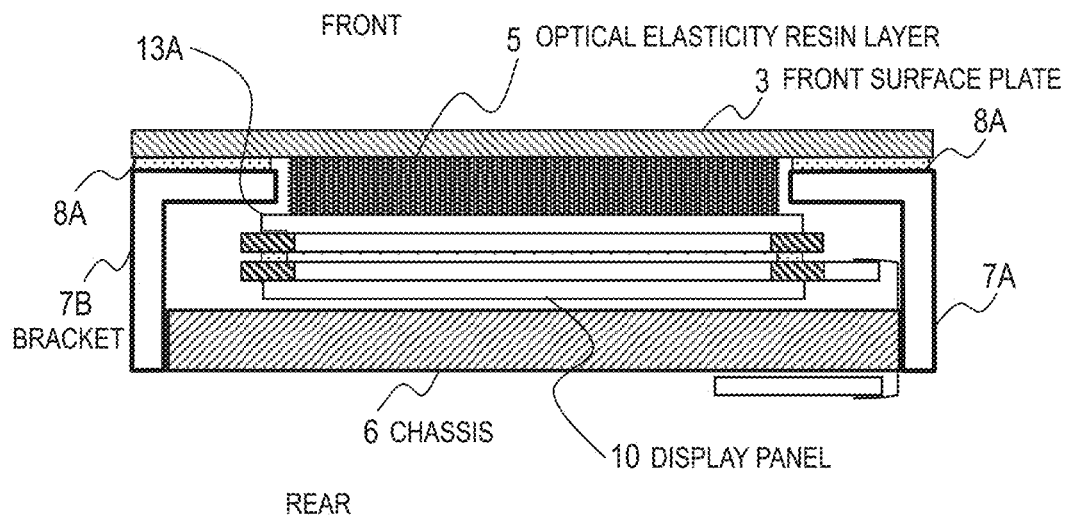
FIG. 13 is a cross-sectional view depicting a configuration of a display device according to Embodiment 8.

A display device of Embodiment 8 will be described with reference to FIG. 13. Differences from Embodiment 1 will be primarily described below. FIG. 13 is a cross-sectional view depicting a configuration of a display device according to Embodiment 8.

The display device includes two brackets 7A and 7B. The bracket 7A corresponds to the bracket 7 of Embodiment 1. The bracket 7B is disposed on a side opposite the bracket 7A such that the brackets sandwich the display panel 10. The side of the TFT substrate 11 (display panel 10) opposite the bracket 7B does not have an FPC mounted thereon. Otherwise, the description for the bracket 7A (bracket 7 of Embodiment 1) similarly applies to the bracket 7B.

By incorporating a plurality of brackets that can have a greater bonding area than the front surface of the side walls of the chassis 6, it is possible to increase the bonding strength between the front surface plate 3 and the case. The display device can include three or more brackets.

Embodiment 9

Figure 14:
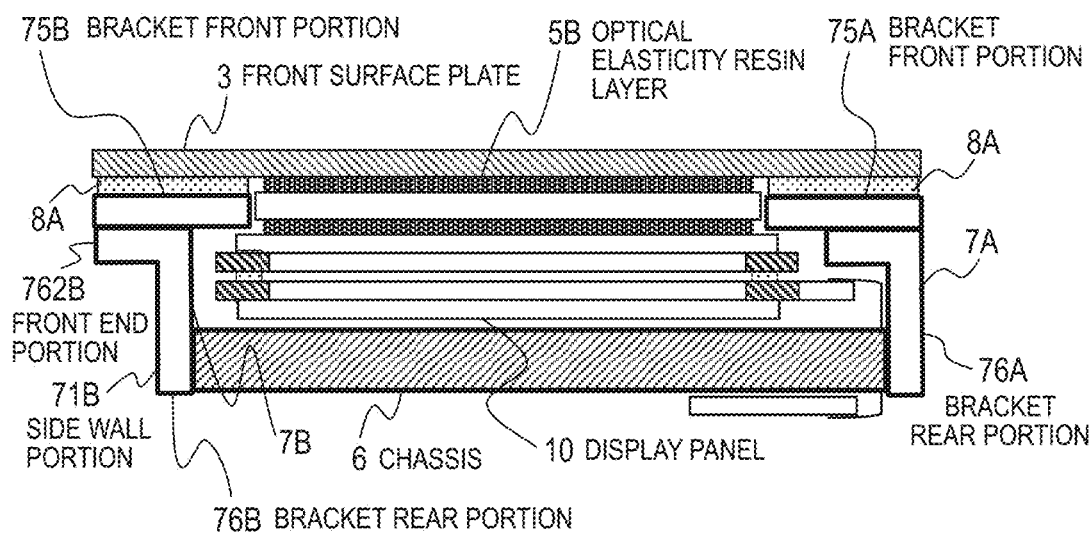
FIG. 14 is a cross-sectional view depicting a configuration of a display device according to Embodiment 9.

A display device of Embodiment 9 will be described with reference to FIGS. 14 to 15D. Differences from Embodiment 2 will be primarily described below. FIG. 14 is a cross-sectional view depicting a configuration of a display device according to Embodiment 9.

The display device includes two brackets 7A and 7B. The bracket 7A corresponds to the bracket 7 of Embodiment 2, and is constituted of a bracket front portion 75A and a bracket rear portion 76A. The bracket 7B is disposed on a side opposite the bracket 7A such that the brackets sandwich the display panel 10. The side of the TFT substrate 11 (display panel 10) opposite the bracket 7B does not have an FPC mounted thereon.

The bracket 7B is constituted of a bracket front portion 75B and a bracket rear portion 76B. The structures of the bracket front portion 75B and the bracket rear portion 76B may be similar to those of the bracket front portion 75A and the bracket rear portion 76A.

The bracket front portion 75B of the bracket 7B protrudes into the space between the polarizing plate 13A and the front surface plate 3, in a manner similar to the bracket front portion 75A. The attachment direction of the bracket rear portion 76B differs from the attachment direction of the bracket rear portion 76A. The front end portion 762B of the bracket rear portion 76B protrudes towards the outside of the display device from the side wall portion 71B. The front surface of the front end portion 762B opposes the outer region of the rear surface of the bracket front portion 75B.

The outer side face (surface on left side of FIG. 14) of the side wall portion 71B is positioned to the inside of the outer edge of the front end portion 762B and the bracket front portion 75B. The beam portion constituted of the front end portion 762B and the bracket front portion 75B protrudes outward and inward from the side wall portion 71B. As a result of the structure of the bracket 7B, it is possible to reduce the size and weight of the chassis 6 (display device).

Figure 15A:
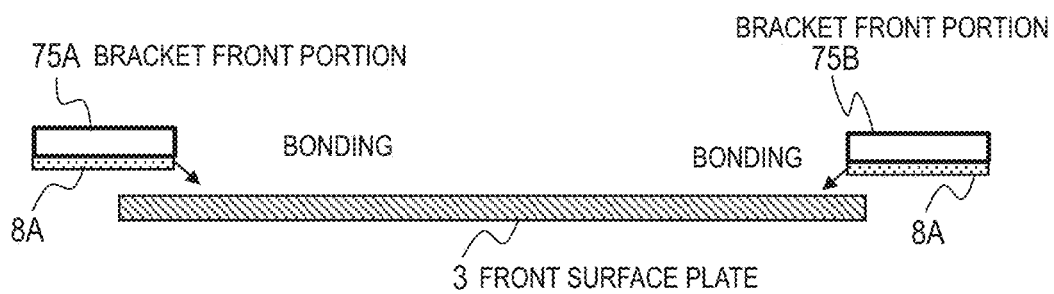
FIG. 15A depicts an assembly step for the display device according to Embodiment 9.

Below, the method for assembling (method for manufacturing) the display device of the present embodiment will be described. FIGS. 15A to 15D respectively depict assembly steps for the display device. As depicted in FIG. 15A, in assembling the display device, the bracket front portions 75A and 75B, the front surfaces of which have bonded thereto the double-sided tapes 8A, are prepared. With the double-sided tapes 8A facing the rear surface of the front surface plate 3, the bracket front portions 75A and 75B are bonded to the rear surface of the front surface plate 3.

Figure 15B:
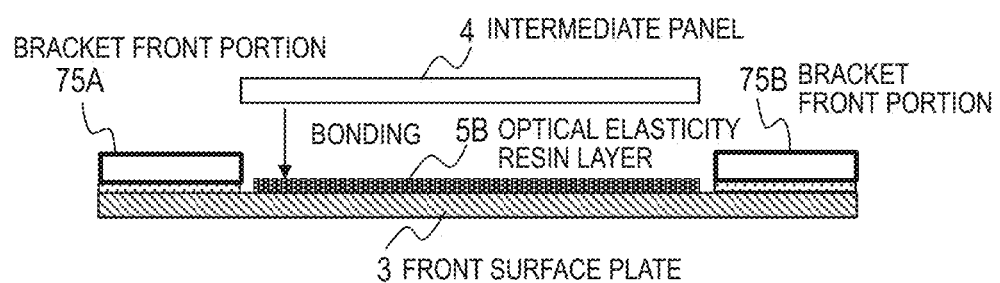
FIG. 15B depicts an assembly step for the display device according to Embodiment 9.

Next, as depicted in FIG. 15B, the rear surface of the front surface plate 3 is coated with an optical elasticity resin in order to form the optical elasticity resin layer 5B thereon, and the intermediate panel 4 and the front surface plate 3 are bonded together by the optical elasticity resin layer 5B.

Figure 15C:
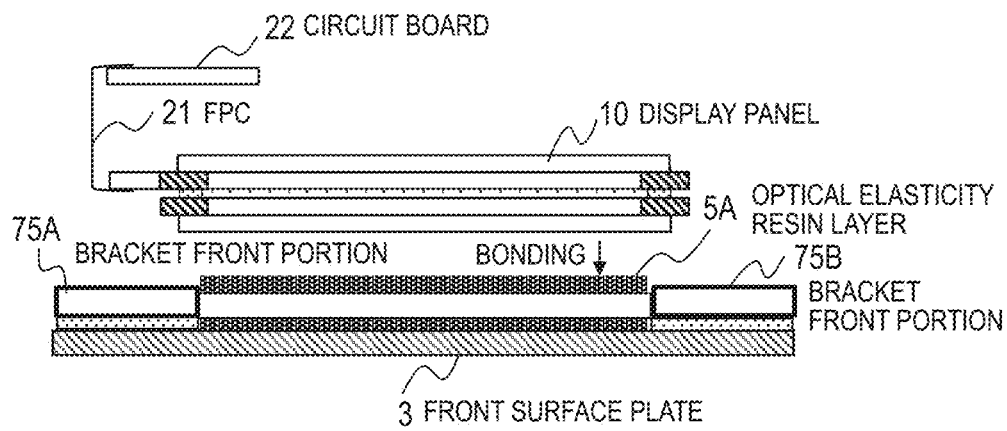
FIG. 15C depicts an assembly step for the display device according to Embodiment 9.

Next, as depicted in FIG. 15C, the rear surface of the intermediate panel 4 is coated with an optical elasticity resin in order to form the optical elasticity resin layer 5A thereon. The front surface plate 3 (intermediate panel 4) and the display panel 10, to which the FPC 21 and the circuit board 22 are mounted, are bonded together by the optical elasticity resin layer 5A.

Figure 15D:
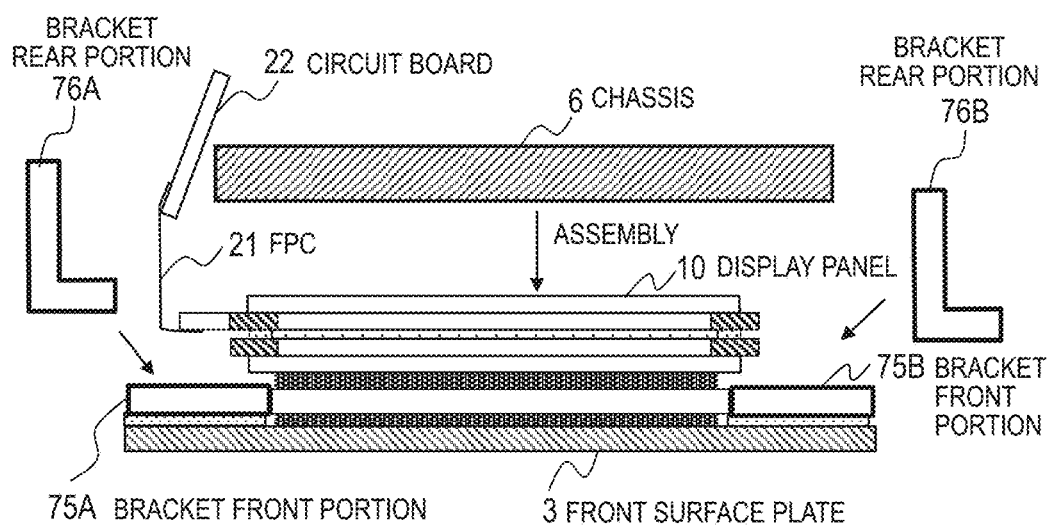
FIG. 15D depicts an assembly step for the display device according to Embodiment 9.

Next, as depicted in FIG. 15D, the bracket rear portions 76A and 76B are fixed to the bracket front portions 75A and 75B by screws. The front end portion of the bracket rear portion 76A faces inward, and the front end portion of the bracket rear portion 76B faces outward. The double-sided tapes are bonded to the rear surface of the front surface plate 3, thereby bonding the chassis 6 to the front surface plate 3. Additionally, the chassis 6 and the bracket rear portions 76A and 76B are screwed to each other.

Embodiment 10

Figure 16A:
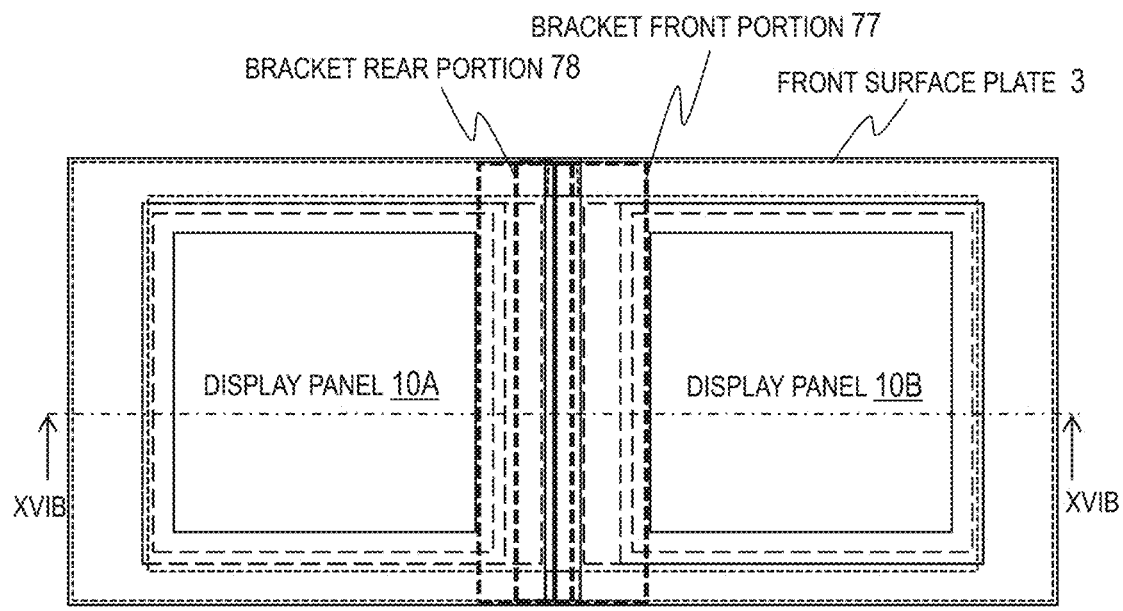
FIG. 16A is a plan view depicting a configuration of a display device according to Embodiment 10.
Figure 16B:
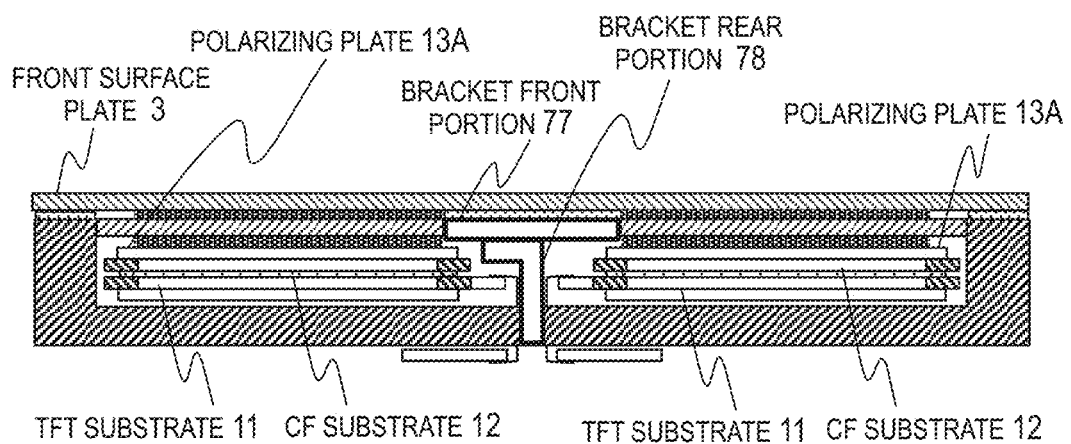
FIG. 16B is a cross-sectional view along the line XVIB-XVIB in FIG. 16A.

A display device of Embodiment 10 will be described with reference to FIGS. 16A and 16B. Differences from Embodiment 2 will be primarily described below. FIG. 16A is a plan view depicting a configuration of a display device according to Embodiment 10. FIG. 16B is a cross-sectional view along the line XVIB-XVIB in FIG. 16A.

A plurality of display panels are arranged as the display panels 10A and 10B are on the front surface plate 3. The display panels 10A and 10B are arranged such that the sides (end faces) where the TFT substrate 11 protrudes beyond the CF substrate 12 are adjacent to each other. The bracket front portion 77 is in the space between the front surface plate 3 and the protruding portions of the TFT substrates 11 of the display panels 10A and 10B, and is located between the polarizing plates 13 of the two display panels and the front surface plate 3.

The bracket rear portion 78 is in the space between the protruding portion of the TFT substrate 11 of the display panel 10A or 10B, and the bracket front portion 77. In making a seamless display device with a shared front surface plate, the adjacent display panels can share a bracket, and thus, it is possible to reduce the gap between the TFT substrates of the display panels. Also, if the front surface plate on which the plurality of display panels are arranged is made of resin and the area thereof is made large, then the strength of the portion between the display panels is weak, resulting in warpage and consequent display anomalies (unevenness) resulting from the warpage, but with the bracket front portion disposed between the display panels as a reinforcing plate, sufficient strength can be ensured, and thus, it is possible to prevent display anomalies resulting from warpage.

Embodiment 11

Figure 17A:
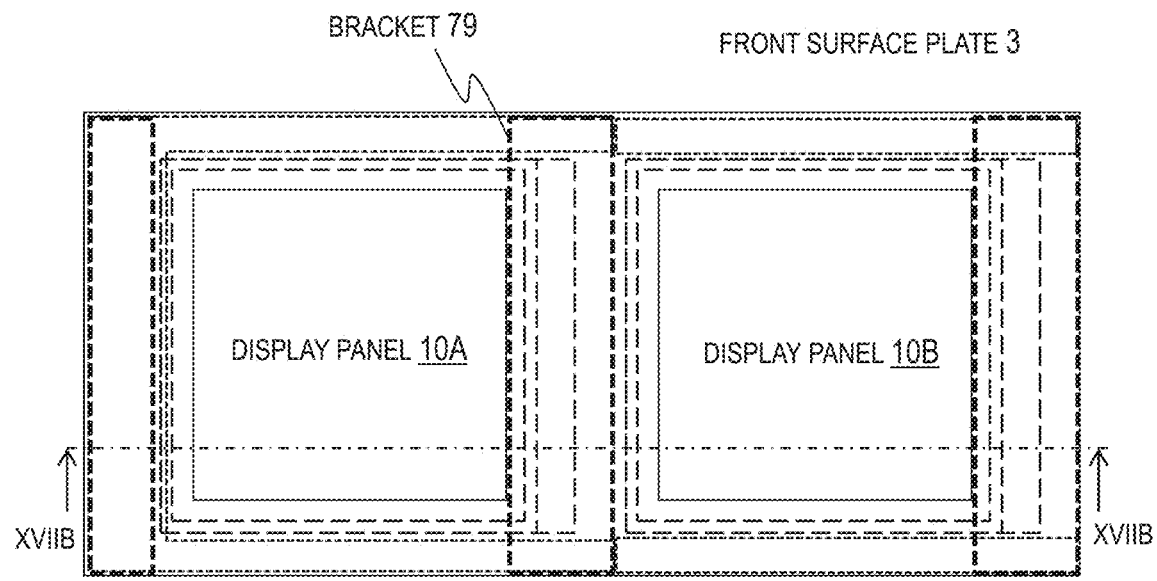
FIG. 17A is a plan view depicting a configuration of a display device according to Embodiment 11.
Figure 17B:
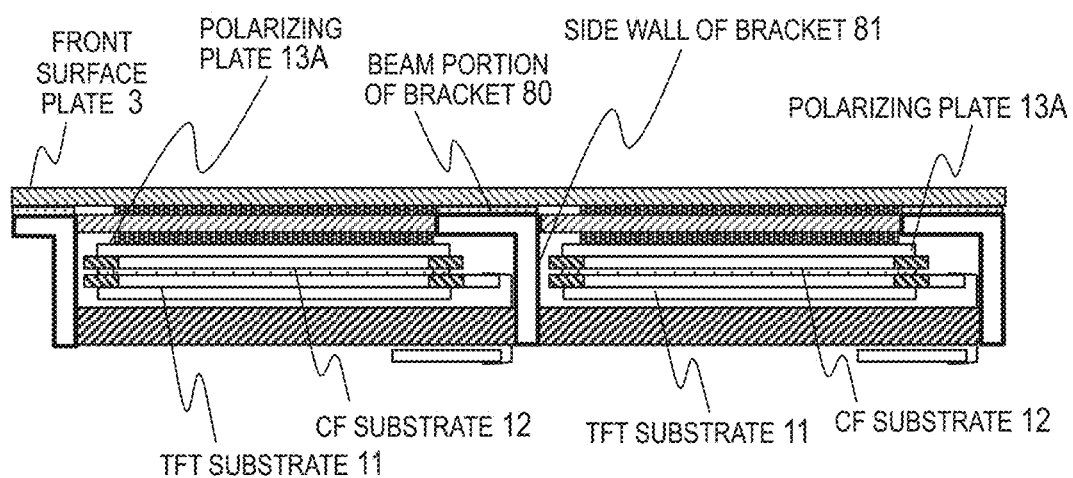
FIG. 17B is a cross-sectional view along the line XVIIB-XVIIB in FIG. 17A.

A display device of Embodiment 11 will be described with reference to FIGS. 17A and 17B. Differences from Embodiment 10 will be primarily described below. FIG. 17A is a plan view depicting a configuration of a display device according to Embodiment 11. FIG. 17B is a cross-sectional view along the line XVIIB-XVIIB in FIG. 17A.

A plurality of display panels are arranged as the display panels 10A and 10B are on the front surface plate 3. The display panels 10A and 10B are arranged such that the side of the display panel 10A where the TFT substrate 11 protrudes beyond the CF substrate 12, and the side of the display panel 10B where the side faces of the CF substrate 12 and the TFT substrate 11 are flush, are adjacent to each other.

The beam portion 80 of the bracket 79 between the display panels 10A and 10B is in the space between the protruding portion of the TFT substrate 11 of the display panel 10A, and the front surface plate 3. The side wall portion 81 of the bracket faces the area where the side faces of the CF substrate 12 and the TFT substrate 11 of the display panel 10B are flush. Similar to Embodiment 10, this configuration can prevent display anomalies resulting from warpage, and enables sharing of a bracket between adjacent display panels, and thus, it is possible to reduce the gap between the TFT substrates of the display panels and to reduce the size and weight of the chassis (display device). In Embodiments 10 and 11, a plurality of display panels with differing sizes and shapes can be used.

Embodiments of the present disclosure were described above, but the present disclosure is not limited to the embodiments above. A person having ordinary skill in the art could easily modify, add, or interchange the elements of the embodiments above within the range of the present disclosure. It is possible to replace a portion of the configuration of one embodiment with the configuration of another embodiment, and it is possible to add to the configuration of the one embodiment the configuration of another embodiment.

What is claimed is:

1. A display device, comprising:
   a chassis;
   a display panel disposed in front of and separated from the chassis;
   a front surface plate that is disposed in front of the display panel, and that holds the display panel in a suspended state via an optical elasticity resin layer; and
   a bracket that is fixed to a side face of the chassis, the bracket being bonded to a rear surface of the front surface plate by an adhesive portion and separated from the display panel with a space therebetween, the bracket including
      a side wall portion that is fixed to the side face of the chassis, rises from rear to front, and extends along a side of the front surface plate, and
      a beam portion in front of the side wall portion, the beam portion extending along the side of the front surface plate, and protruding along the rear surface of the front surface plate, from the side wall portion to an area between the display panel and the front surface plate,
   wherein the adhesive portion is bonded to a front surface of the beam portion and to the rear surface of the front surface plate,
   wherein, at the front surface of the beam portion and the rear surface of the front surface plate, an adhesive region of the adhesive portion includes a region between the display panel and the front surface plate,
   wherein the bracket is attached to only the front surface plate and the chassis,
   wherein the bracket includes:
      a bracket rear portion and
      a plate-shaped bracket front portion fixed to the bracket rear portion,
   wherein the bracket rear portion includes:
      the side wall portion, and
      a front end portion that is a portion of the beam portion, that extends along the side of the front surface plate, that is continuous with the side wall portion, and that protrudes along the rear surface of the front surface plate from the side wall portion,
   wherein the bracket front portion is disposed on the front surface of the front end portion, extends along the side of the front surface plate, and protrudes along the rear surface of the front surface plate, from the front end portion to the area between the display panel and the front surface plate,
   wherein the adhesive portion is bonded to a front surface of the bracket front portion and to the rear surface of the front surface plate, and
   wherein, at the front surface of the bracket front portion and the rear surface of the front surface plate, the adhesive region of the adhesive portion includes the region between the display panel and the front surface plate.

2. The display device according to claim 1,
   wherein the display panel includes a front substrate and a rear substrate that are stacked,
   wherein the rear substrate protrudes further outward than the front substrate at a side facing the bracket,
   wherein the front end portion protrudes from the side wall portion to a space between the rear substrate and the front surface plate,
   wherein the bracket front portion protrudes from the front end portion to a space between the front substrate and the front surface plate, and
   wherein, at the front surface of the bracket front portion and the rear surface of the front surface plate, the adhesive region of the adhesive portion includes a region between the front substrate and the front surface plate.

3. The display device according to claim 1,
wherein the display panel includes a front substrate and a rear substrate that are stacked,
wherein end faces of the front substrate and the rear substrate that face the bracket are flush, and
wherein the front end portion protrudes outward from the side wall portion.

4. A display device, comprising:
a chassis;
a display panel disposed in front of and separated from the chassis;
a front surface plate that is disposed in front of the display panel, and that holds the display panel in a suspended state via an optical elasticity resin layer; and
a bracket that is fixed to a side face of the chassis, the bracket being bonded to a rear surface of the front surface plate by an adhesive portion and separated from the display panel with a space therebetween, the bracket including
  a side wall portion that is fixed to the side face of the chassis, rises from rear to front, and extends along a side of the front surface plate, and
  a beam portion in front of the side wall portion, the beam portion extending along the side of the front surface plate, and protruding along the rear surface of the front surface plate, from the side wall portion to an area between the display panel and the front surface plate,
wherein the adhesive portion is bonded to a front surface of the beam portion and to the rear surface of the front surface plate,
wherein, at the front surface of the beam portion and the rear surface of the front surface plate, an adhesive region of the adhesive portion includes a region between the display panel and the front surface plate,
wherein the bracket is attached to only the front surface plate and the chassis,
wherein the display panel is a liquid crystal panel,
wherein the beam portion protrudes to a space between a front polarizing plate of the display panel and the front surface plate, and
wherein, at the front surface of the beam portion and the rear surface of the front surface plate, an adhesive region of the adhesive portion includes a region between the front polarizing plate and the front surface plate.

5. A manufacturing method for a display device including
a chassis
a display panel disposed in front of and separated from the chassis
a front surface plate that is disposed in front of the display panel, and that holds the display panel in a suspended state via an optical elasticity resin layer and
a bracket that is fixed to a side face of the chassis, the bracket being bonded to a rear surface of the front surface plate by an adhesive portion and separated from the display panel with a space therebetween, the bracket including
  a side wall portion that is fixed to the side face of the chassis, rises from rear to front, and extends along a side of the front surface plate, and
  a beam portion in front of the side wall portion, the beam portion extending along the side of the front surface plate and protruding along the rear surface of the front surface plate from the side wall portion,
wherein a tip of the beam portion is located in an area between the display panel and the front surface plate,
wherein the adhesive portion is bonded to a front surface of the beam portion and to the rear surface of the front surface plate,
wherein, at the front surface of the beam portion and the rear surface of the front surface plate, an adhesive region of the adhesive portion includes a region between the display panel and the front surface plate, and
wherein the bracket is attached to only the front surface plate and the chassis,
the manufacturing method comprising:
  attaching a component including at least the tip of the beam portion to the rear surface of the front surface plate, via the adhesive portion;
  attaching the display panel to the rear surface of the front surface plate such that the display panel and the front surface plate sandwich the optical elasticity resin layer located on the rear surface of the front surface plate and the display panel is separated from the component, after attaching the component;
  attaching the chassis to the rear surface of the front surface plate to be separated from the display panel, after attaching the display panel; and
  attaching the component to the chassis,
wherein the component is attached to only the front surface plate and the chassis,
wherein the bracket includes:
  a bracket rear portion, and
  a plate-shaped bracket front portion fixed to the bracket rear portion,
wherein the bracket rear portion includes:
  the side wall portion, and
  a front end portion that is a portion of the beam portion, that extends along the side of the front surface plate, that is continuous with the side wall portion, and that protrudes along the rear surface of the front surface plate from the side wall portion,
wherein the bracket front portion is disposed on the front surface of the front end portion, extends along the side of the front surface plate, and protrudes along the rear surface of the front surface plate, from the front end portion to the area between the display panel and the front surface plate,
wherein the adhesive portion is bonded to a front surface of the bracket front portion and to the rear surface of the front surface plate,
wherein, at the front surface of the bracket front portion and the rear surface of the front surface plate, the adhesive region of the adhesive portion includes the region between the display panel and the front surface plate,
wherein the component is the bracket front portion, and
wherein the manufacturing method further comprises:
  attaching the bracket front portion to the rear surface of the front surface plate, via the adhesive portion; and
  attaching the bracket rear portion to the bracket front portion after attaching the display panel.

* * * * *